US012712352B2

(12) United States Patent
Yokota et al.

(10) Patent No.: US 12,712,352 B2
(45) Date of Patent: Aug. 18, 2026

(54) ELECTRICAL JUNCTION BOX

(71) Applicants: Sumitomo Wiring Systems, Ltd., Yokkaichi (JP); Honda Motor Co., Ltd., Tokyo (JP)

(72) Inventors: Tomohiro Yokota, Yokkaichi (JP); Masami Hirayama, Yokkaichi (JP); Yuki Watanabe, Yokkaichi (JP); Kiyotaka Hoga, Yokkaichi (JP); Ryo Kitano, Tokyo (JP); Masatoshi Suzuki, Tokyo (JP)

(73) Assignees: Sumitomo Wiring Systems, Ltd., Yokkaichi (JP); Honda Motor Co., Ltd., Tokyo (JP)

( * ) Notice: Subject to any disclaimer, the term of this patent is extended or adjusted under 35 U.S.C. 154(b) by 679 days.

(21) Appl. No.: 18/170,660

(22) Filed: Feb. 17, 2023

(65) Prior Publication Data

US 2023/0283059 A1 Sep. 7, 2023

(30) Foreign Application Priority Data

Feb. 18, 2022 (JP) ................................ 2022-023679

(51) Int. Cl.
*H02G 15/06* (2006.01)
*B60R 16/02* (2006.01)
(Continued)

(52) U.S. Cl.
CPC ......... *H02G 15/06* (2013.01); *B60R 16/0215* (2013.01); *B60R 16/0238* (2013.01);
(Continued)

(58) Field of Classification Search
CPC ............ H02G 15/06; H02G 3/10; H02G 3/16; H02G 3/08; B60R 16/0238; B60R 16/02;
(Continued)

(56) References Cited

U.S. PATENT DOCUMENTS 7,918,692 B1 * 4/2011 Hertzler ............... H01R 9/2408 439/810
9,768,600 B1 * 9/2017 Kato .................... H02G 15/113
(Continued)

FOREIGN PATENT DOCUMENTS

CN 102185190 A 9/2011
JP S56-131680 U 10/1981
(Continued)

OTHER PUBLICATIONS

English Translation JPS6093277; Mitsubishi Electric Corp; Published Jun. 25, 1985 (Year: 1985).*
(Continued)

*Primary Examiner* — Steven T Sawyer
(74) *Attorney, Agent, or Firm* — Brooks Kushman P.C.

(57) ABSTRACT

An electrical junction box to be installed in a vehicle includes: a terminal block; first conductive members provided to the terminal block and placed so as to be aligned in a row; second conductive members provided to the terminal block and placed so as to be aligned in another row; first bolts tightened to the terminal block from below and fixing electric wires, which are electrically connected to the first conductive members, respectively, to the terminal block; second bolts tightened to the terminal block from below and fixing electric wires, which are electrically connected to the second conductive members, respectively, to the terminal block; a first cover member provided to the terminal block and covering heads of the first bolts from below; and a second cover member provided to the terminal block and covering heads of the second bolts from below.

21 Claims, 16 Drawing Sheets

(51) Int. Cl.

| | |
|---|---|
| ***B60R 16/023*** | (2006.01) |
| ***H02G 3/08*** | (2006.01) |
| ***H02G 3/10*** | (2006.01) |
| ***H02G 3/16*** | (2006.01) |

(52) U.S. Cl.
CPC ................ *H02G 3/08* (2013.01); *H02G 3/10* (2013.01); *H02G 3/16* (2013.01)

(58) Field of Classification Search
CPC ... B60R 16/0215; H01R 9/2416; H01R 11/12; H01R 9/223
See application file for complete search history.

(56) References Cited

U.S. PATENT DOCUMENTS

| | | | | |
|---|---|---|---|---|
| 2015/0263442 | A1* | 9/2015 | Bakatsias | H01R 12/75 439/78 |
| 2018/0212345 | A1* | 7/2018 | Boisnier | H01R 9/223 |
| 2020/0122657 | A1 | 4/2020 | Goto et al. | |
| 2022/0320844 | A1* | 10/2022 | Yokota | H02G 3/18 |
| 2022/0368056 | A1 | 11/2022 | Kobayashi et al. | |

FOREIGN PATENT DOCUMENTS

| | | | |
|---|---|---|---|
| JP | S60-093277 | U | 6/1985 |
| JP | 2000-113918 | A | 4/2000 |
| JP | 2012-009747 | A | 1/2012 |
| JP | 2020042912 | A | 3/2020 |
| JP | 2021013267 | A | 2/2021 |
| WO | 2021079596 | A1 | 4/2021 |

OTHER PUBLICATIONS

English Translation JP2012009747; Panasonic Electric Works Ltd, Toyota Motor Corp; Abe et al. Published Jan. 11, 2012 (Year: 2012).*

English Translation JPS56131680; Published Oct. 6, 1981 (Year: 1981).*

* cited by examiner

UP
FRONT
RIGHT
DOWN
LEFT
BACK
3
13
13
12
22
8
14
103
103
11
6
40
15
15
20
15
8
12
15
21
15
1
7
4
IV
22

4
11
12
16
22
25
V
20
21
103
7
(7a)
5
15
(14)
23
II
UP
DOWN
LEFT
RIGHT

UP
DOWN
LEFT
RIGHT
103
8 (8a)
41
18B (18)
12
7
6
15
(17) 17B
14
182
172
19
5
IX
19a
20
(8a) 8
103
(8a) 8
44 (43)
181
18A (18)
11
(17) 17A
171
42
40
VIII
4

RIGHT
UP
DOWN
LEFT
41
(8a)
8
472
462
45a
45
45b
181
(46)
46A
18A
(18)
183
461
47A
(47)
471
(17)
17A
4
171
40
42

UP
DOWN
LEFT
RIGHT
464
463
474
473
174
172
173
(17)
17B
182
184
18B
(18)
46B
(46)
47B
(47)
41b
41a
19a
19b
19
40
41

ELECTRICAL JUNCTION BOX

CROSS-REFERENCE TO RELATED APPLICATIONS

This application claims priority based on Japanese Patent Application No. 2022-023679 filed on Feb. 18, 2022, the entire contents of which are incorporated herein by reference.

TECHNICAL FIELD

The present disclosure relates to an electrical junction box.

BACKGROUND

An electric wire that supplies power from an in-vehicle battery to each in-vehicle load in a vehicle is branched into a plurality of wires in an electrical junction box, and the plurality of electric wires are connected to the in-vehicle loads, respectively. Such an electrical junction box includes a terminal block, a plurality of busbars which are provided on the terminal block, and a plurality of bolts which fix a plurality of electric wires to the terminal block in a state where the electric wires are electrically connected to the respective busbars (see, for example, Japanese Laid-Open Patent Publication No. 2021-13267). The plurality of busbars described in Japanese Laid-Open Patent Publication No. 2021-13267 are divided into an upper stage and a lower stage of the terminal block and placed in two rows so as to be parallel to each other. The electric wires are fixed to the terminal block by the bolts at positions corresponding to the busbars in each row.

When the electrical junction box of Japanese Laid-Open Patent Publication No. 2021-13267 is installed such that the head of each bolt faces downward, each bolt in each row may become loose and fall off from the terminal block. If the bolt falls off, the bolt may cause a problem such as short-circuiting of another component in the electrical junction box.

Therefore, an object of the present disclosure is to provide an electrical junction box that can inhibit bolts from falling off therefrom.

SUMMARY

An electrical junction box according to an aspect of the present disclosure is an electrical junction box to be installed in a vehicle, the electrical junction box including: a terminal block; a plurality of first conductive members provided to the terminal block and placed so as to be aligned in a row; a plurality of second conductive members provided to the terminal block and placed so as to be aligned in another row; a plurality of first bolts tightened to the terminal block from below and fixing electric wires, which are electrically connected to the first conductive members, respectively, to the terminal block; a plurality of second bolts tightened to the terminal block from below and fixing electric wires, which are electrically connected to the second conductive members, respectively, to the terminal block; a first cover member provided to the terminal block and covering heads of the plurality of first bolts from below; and a second cover member provided to the terminal block and covering heads of the plurality of second bolts from below.

Effects of the Present Disclosure

The electrical junction box of the present disclosure can inhibit the bolts from falling off therefrom.

DETAILED DESCRIPTION OF PREFERRED EMBODIMENTS

Figure 1:
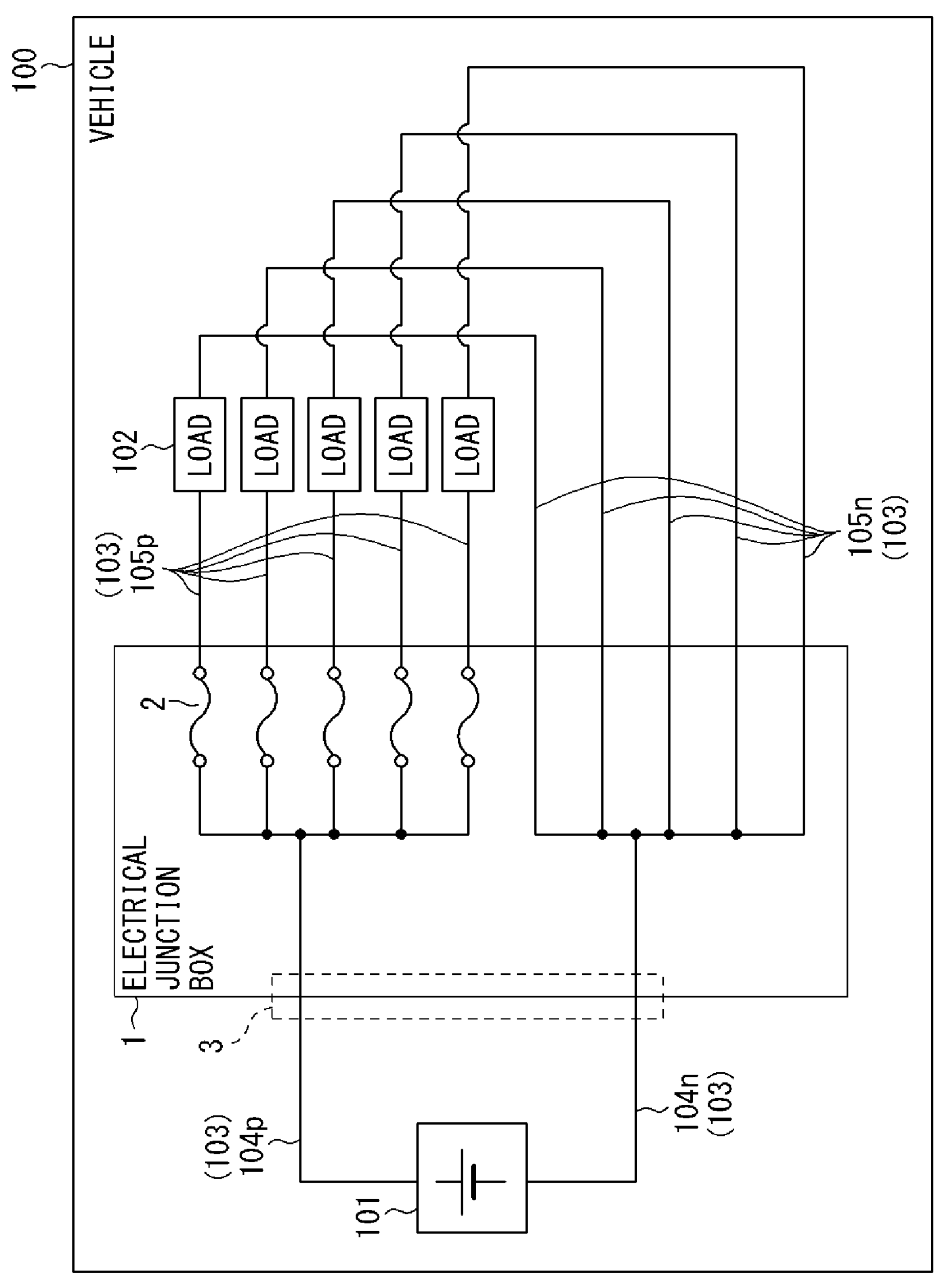
FIG. 1 is a schematic configuration diagram of a vehicle including an electrical junction box according to an embodiment.

First, the outlines of embodiments of the present disclosure are listed and described.

First Aspect

In a first aspect, an electrical junction box of the present disclosure is an electrical junction box to be installed in a vehicle, the electrical junction box including: a terminal block; a plurality of first conductive members provided to the terminal block and placed so as to be aligned in a row; a plurality of second conductive members provided to the terminal block and placed so as to be aligned in another row; a plurality of first bolts tightened to the terminal block from below and fixing electric wires, which are electrically connected to the first conductive members, respectively, to the terminal block; a plurality of second bolts tightened to the terminal block from below and fixing electric wires, which are electrically connected to the second conductive members, respectively, to the terminal block; a first cover member provided to the terminal block and covering heads of the plurality of first bolts from below; and a second cover member provided to the terminal block and covering heads of the plurality of second bolts from below.

In the electrical junction box, the heads of the plurality of first bolts which fix the electric wires electrically connected to the first conductive members, to the terminal block, are covered with the first cover member from below. In addition, the heads of the plurality of second bolts which fix the electric wires electrically connected to the second conductive members, to the terminal block, are covered with the second cover member from below. Accordingly, even if the first bolt becomes loose with respect to the terminal block, the head of the first bolt comes into contact with the first cover member, whereby the first bolt can be inhibited from falling off from the terminal block. Similarly, even if the second bolt becomes loose with respect to the terminal block, the head of the second bolt comes into contact with the second cover member, whereby the second bolt can be inhibited from falling off from the terminal block. In addition, the first cover member and the second cover member collectively cover the heads of the plurality of first bolts and the heads of the plurality of second bolts, respectively. Therefore, the number of components is reduced, so that the configuration of the electrical junction box can be simplified.

Second Aspect

In a second aspect, the heads of the plurality of second bolts are placed on an internal side of the terminal block with respect to the heads of the plurality of first bolts, and the second cover member covers the heads of the plurality of second bolts from below in a state where the second cover member is inserted from a lateral side of the terminal block into the internal side of the terminal block.

In this case, since the second cover member is inserted from the lateral side into the internal side of the terminal block, even when the heads of the second bolts are placed on the internal side of the terminal block with respect to the heads of the first bolts, the heads of the second bolts can be covered with the second cover member.

Third Aspect

In a third aspect, the terminal block has a lower projection portion which projects downward with respect to the heads of the plurality of first bolts, and the first cover member has a first cover main body which extends in a row direction in which the plurality of first conductive members are aligned, a lower fitting hole which is formed in the first cover main body and into which the lower projection portion is fitted, and a side surface contact portion which is provided so as to project laterally from a side surface in the row direction of the lower fitting hole and comes into contact with a side surface of the lower projection portion in a state where the lower projection portion is fitted into the lower fitting hole.

In this case, even if a dimensional error occurs in any of the lower projection portion of the terminal block and the lower fitting hole of the first cover main body, when the lower projection portion is fitted into the lower fitting hole, the side surface contact portion which projects from the side surface in the row direction of the lower fitting hole can be brought into contact with the side surface of the lower projection portion. Accordingly, the first cover member can be inhibited from rattling in the row direction with respect to the lower projection portion, so that generation of abnormal sound due to such rattling can be suppressed.

Fourth Aspect

In a fourth aspect, the lower projection portion is a part of a partition plate which insulates the adjacent first bolts from each other.

In this case, the terminal block does not have to have the lower projection portion separately provided therein, so that the configuration of the electrical junction box can be further simplified.

Fifth Aspect

In a fifth aspect, a projection portion side inclined surface is formed in the side surface of the lower projection portion so as to be inclined such that a thickness in the row direction of the lower projection portion gradually decreases toward a lower side.

In this case, owing to the projection portion side inclined surface formed in the side surface of the lower projection portion, the lower projection portion can be smoothly fitted into the lower fitting hole of the first cover main body.

Sixth Aspect

In a sixth aspect, a contact side inclined surface is formed in a projection end surface of the side surface contact portion so as to be inclined toward the side surface of the lower fitting hole as extending upward.

In this case, owing to the contact side inclined surface formed in the projection end surface of the side surface contact portion, the lower projection portion can be further smoothly fitted into the lower fitting hole of the first cover main body.

Seventh Aspect

In a seventh aspect, the projection end surface of the side surface contact portion has an arcuate surface which comes into line contact with the side surface of the lower projection portion.

In this case, since the arcuate surface of the side surface contact portion comes into line contact with the side surface of the lower projection portion, the contact surface pressure between the side surface contact portion and the lower projection portion can be increased as compared to the case where the side surface contact portion comes into surface contact with the side surface of the lower projection portion. Accordingly, the first cover member can be further inhibited from rattling in the row direction with respect to the lower projection portion.

Eighth Aspect

In an eighth aspect, a contact length in an up-down direction by which the projection end surface of the side surface contact portion comes into contact with the side surface of the lower projection portion when the lower projection portion is fitted into the lower fitting hole is not greater than ½ of a contact length in the up-down direction by which the side surface of the lower projection portion comes into contact with the projection end surface.

In this case, the contact length in the up-down direction by which the side surface contact portion comes into contact with the lower projection portion when the lower projection portion is fitted into the lower fitting hole can be shortened. Accordingly, the lower projection portion can be further smoothly fitted into the lower fitting hole.

Ninth Aspect

In a ninth aspect, the terminal block has a lateral projection portion which projects laterally, and the first cover member has a first cover side body which extends in the up-down direction on a lateral side of the terminal block, a lateral fitting hole which is formed in the first cover side body and into which the lateral projection portion is fitted, and an upper surface contact portion which is provided so as to project downward from an upper surface of the lateral fitting hole and comes into contact with an upper surface of the lateral projection portion in a state where the lateral projection portion is fitted into the lateral fitting hole.

In this case, even if a dimensional error occurs in any of the lateral projection portion of the terminal block and the lateral fitting hole of the first cover side body, the upper surface contact portion which projects downward from the upper surface of the lateral fitting hole can be brought into contact with the upper surface of the lateral projection portion when the lateral projection portion is fitted into the lateral fitting hole. Accordingly, the first cover member can be inhibited from rattling in the up-down direction with respect to the lateral projection portion, so that generation of abnormal sound due to such rattling can be suppressed.

Tenth Aspect

In a tenth aspect, a first inclined surface is formed in a lower surface of the upper surface contact portion so as to be inclined upward toward a side opposite to a fitting direction of the lateral projection portion.

In this case, owing to the first inclined surface formed in the lower surface of the upper surface contact portion, the lateral projection portion can be smoothly fitted into the lateral fitting hole of the first cover side body.

Eleventh Aspect

In an eleventh aspect, a second inclined surface is formed in the lower surface of the upper surface contact portion so as to be inclined in the same direction as the first inclined surface on the fitting direction side of the first inclined surface and come into contact with the upper surface of the lateral projection portion.

In this case, the reliability for the upper surface contact portion to come into contact with the lateral projection portion can be increased by the second inclined surface formed in the lower surface of the upper surface contact portion.

Twelfth Aspect

In a twelfth aspect, the second inclined surface is more gently inclined than the first inclined surface.

In this case, since the second inclined surface which is more gently inclined than the first inclined surface in the upper surface contact portion comes into contact with the lateral projection portion, a state where the upper surface contact portion and the lateral projection portion are in contact with each other is easily maintained. Accordingly, the lateral projection portion can be inhibited from being removed from the lateral fitting hole.

Thirteenth Aspect

In a thirteenth aspect, the terminal block has an upper support portion which projects downward with respect to the heads of the plurality of second bolts, and a lower support portion which is placed below the upper support portion so as to be spaced apart therefrom, and the second cover member has a second cover main body which extends in another row direction in which the plurality of second conductive members are aligned and is inserted between the upper support portion and the lower support portion, an upper side contact portion which is provided so as to project upward from an upper surface of the second cover main body and comes into contact with a lower surface of the upper support portion, and a lower side contact portion which is provided so as to project downward from a lower surface of the second cover main body and comes into contact with an upper surface of the lower support portion.

In this case, even if a dimensional error occurs in any of the upper support portion, the lower support portion, and the second cover main body of the terminal block, when the second cover main body is inserted between the upper support portion and the lower support portion, the upper side contact portion of the second cover main body can be brought into contact with the lower surface of the upper support portion, and the lower side contact portion of the second cover main body can be brought into contact with the upper surface of the lower support portion. Accordingly, the second cover member can be inhibited from rattling in the up-down direction with respect to the terminal block, so that generation of abnormal sound due to such rattling can be suppressed.

Fourteenth Aspect

In a fourteenth aspect, the lower support portion is a part of a partition plate which insulates the adjacent first bolts from each other.

In this case, the terminal block does not have to have the lower support portion separately provided therein, so that the configuration of the electrical junction box can be further simplified.

Fifteenth Aspect

In a fifteenth aspect, an upper side inclined surface is formed in an upper surface of the upper side contact portion so as to be inclined downward toward an insertion end side of the second cover main body.

In this case, owing to the upper side inclined surface formed in the upper surface of the upper side contact portion, the second cover member can be smoothly inserted into the terminal block.

Sixteenth Aspect

In a sixteenth aspect, an upper support side inclined surface is formed in the lower surface of the upper support portion so as to be inclined upward toward a side opposite to an insertion direction of the second cover main body.

In this case, owing to the upper support side inclined surface formed in the lower surface of the upper support portion, the second cover member can be further smoothly inserted into the terminal block.

Seventeenth Aspect

In a seventeenth aspect, a lower side inclined surface is formed in a lower surface of the lower side contact portion so as to be inclined upward toward the insertion end side of the second cover main body.

In this case, owing to the lower side inclined surface formed in the lower surface of the lower side contact portion, the second cover member can be further smoothly inserted into the terminal block.

Eighteenth Aspect

In an eighteenth aspect, a lower support side inclined surface is formed in the upper surface of the lower support portion so as to be inclined downward toward the side opposite to the insertion direction of the second cover main body.

In this case, owing to the lower support side inclined surface formed in the upper surface of the lower support portion, the second cover member can be further smoothly inserted into the terminal block.

Nineteenth Aspect

In a nineteenth aspect, the terminal block has a pair of the lower support portions which are placed so as to be spaced apart from each other in the other row direction, and an intermediate support portion which is placed between the pair of the lower support portions, and an upper surface of the intermediate support portion is located below the upper surface of each of the lower support portions.

In this case, when inserting the second cover member from the lateral side of the terminal block, the second cover main body and the lower side contact portion can be inhibited from coming into contact with the upper surface of the intermediate support portion of the terminal block. Accordingly, the second cover member can be further smoothly inserted into the terminal block.

Twentieth Aspect

In a twentieth aspect, an intermediate inclined surface is formed in the upper surface of the intermediate support portion so as to be inclined downward toward the side opposite to the insertion direction of the second cover main body.

In this case, owing to the intermediate inclined surface formed on the intermediate support portion, the second cover member can be further smoothly inserted into the terminal block.

Twenty-First Aspect

In a twenty-first aspect, the second cover member has a restraining portion which restrains the second cover member from coming out from the terminal block.

In this case, since the restraining portion can restrain the second cover member from coming out from the terminal block, the second bolts can be inhibited from falling off from the terminal block.

Hereinafter, embodiments of the present disclosure will be described in detail with reference to the accompanying drawings. At least some parts of the embodiments described below may be combined together as desired.

Configuration of Vehicle

FIG. 1 is a schematic configuration diagram of a vehicle including an electrical junction box according to an embodiment. In FIG. 1, a power storage device 101, a plurality of in-vehicle loads 102, electric wires 103, and an electrical junction box 1 are installed in a vehicle 100.

The power storage device 101 is, for example, a high-voltage battery for electric vehicles (EVs) such as a lead battery or lithium-ion battery. Each in-vehicle load 102 is, for example, an in-vehicle device such as a drive motor, an in-vehicle air conditioning device, an in-vehicle ECU, or an in-vehicle relay device. The plurality of in-vehicle loads 102 are connected in parallel. A voltage outputted from the power storage device 101 is applied to each in-vehicle load 102 via the electric wires 103. The electric wires 103 include electric wires 104*p* and 105*p* on the positive electrode side and electric wires 104*n* and 105*n* on the negative electrode side.

The electrical junction box 1 is interposed between the power storage device 101 and the plurality of in-vehicle loads 102. The electrical junction box 1 includes a plurality of electrical components 2 and a connector 3. Each of the plurality of electrical components 2 is, for example, a fuse, a relay, a semiconductor switch, or the like. The electric wire 104*p* on the positive electrode side and the electric wire 104*n* on the negative electrode side which extend from the power storage device 101 are connected to the connector 3.

The electric wire 105*p* on the positive pole side and the electric wire 105*n* on the negative electrode side extending from the connector 3 are each branched into a plurality of wires (five wires in FIG. 1) in the electrical junction box 1. In the electrical junction box 1, each electrical component 2 is provided on the branched electric wire 105*p* on the positive pole side. Each electrical component 2 may be provided on the electric wire 105*n* on the negative electrode side. The branched electric wire 104*p* on the positive electrode side and the branched electric wire 105*n* on the negative electrode side are connected to each in-vehicle load 102 outside the electrical junction box 1. Accordingly, a parallel circuit is formed.

The electrical junction box 1 configured as described above functions as a protective device in which, for example, when a short-circuit or the like occurs in any one of the in-vehicle loads 102, the fuse of the electrical component 2 is melted in response to an overcurrent, and the path of the electric wire 105*p* connected to the in-vehicle load 102 is electrically interrupted. In particular, the electrical junction box 1 is useful in EVs and other vehicles equipped with high-voltage batteries.

Configuration of Electrical Junction Box

Figure 2:
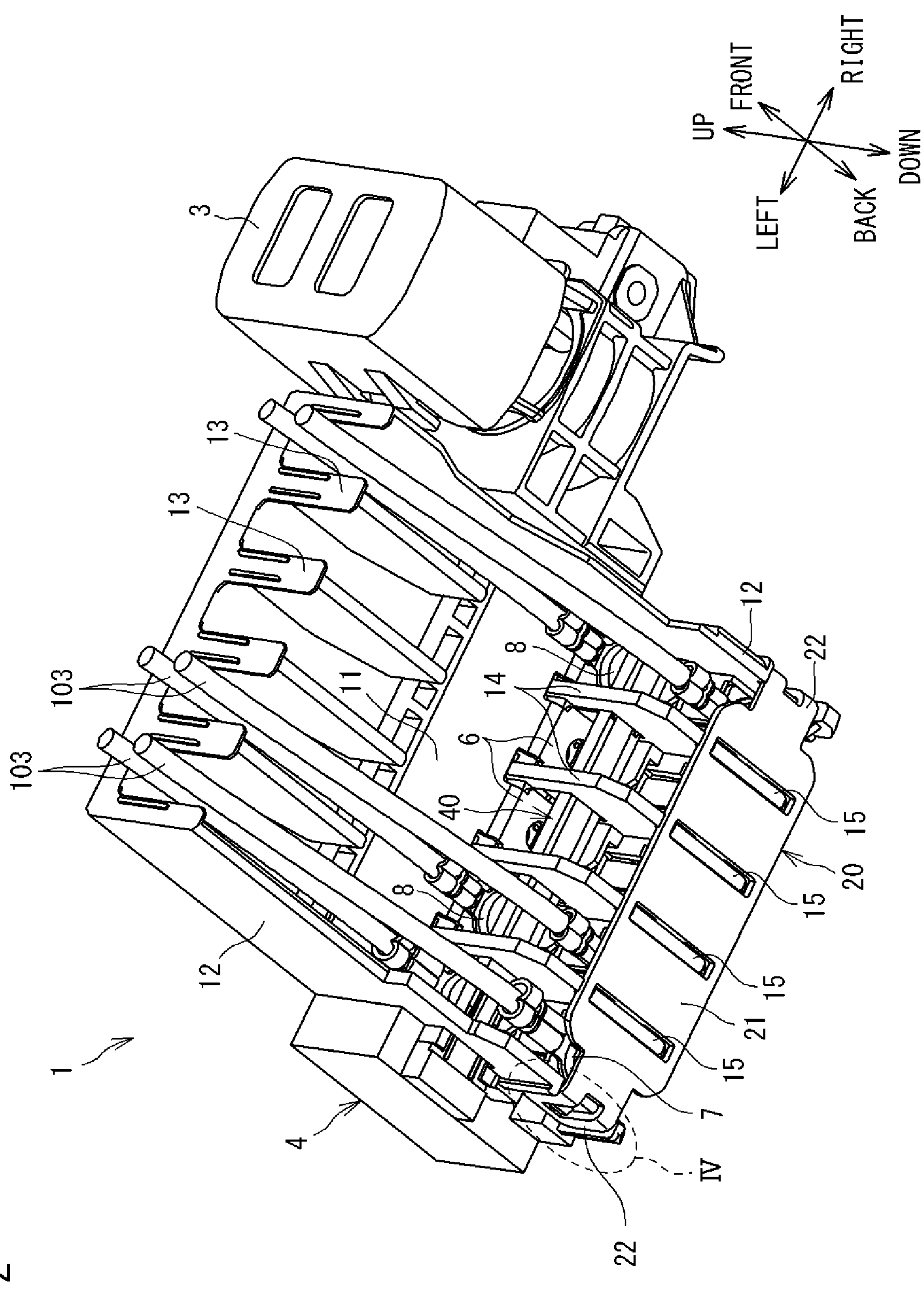
FIG. 2 is a perspective view of the electrical junction box.

FIG. 2 is a perspective view of the electrical junction box 1. In the following description of the present embodiment, directions such as “up”, “down”, “right”, “left”, “front”, and “back” mean directions shown in FIG. 2. The electrical junction box 1 includes a terminal block 4, a plurality of first conductive plates (first conductive members) 5, a plurality of second conductive plates (second conductive members) 6, a plurality of first bolts 7 (see FIG. 3), a plurality of second bolts 8 (see FIG. 3), a first cover member 20, and a second cover member 40.

Figure 3:
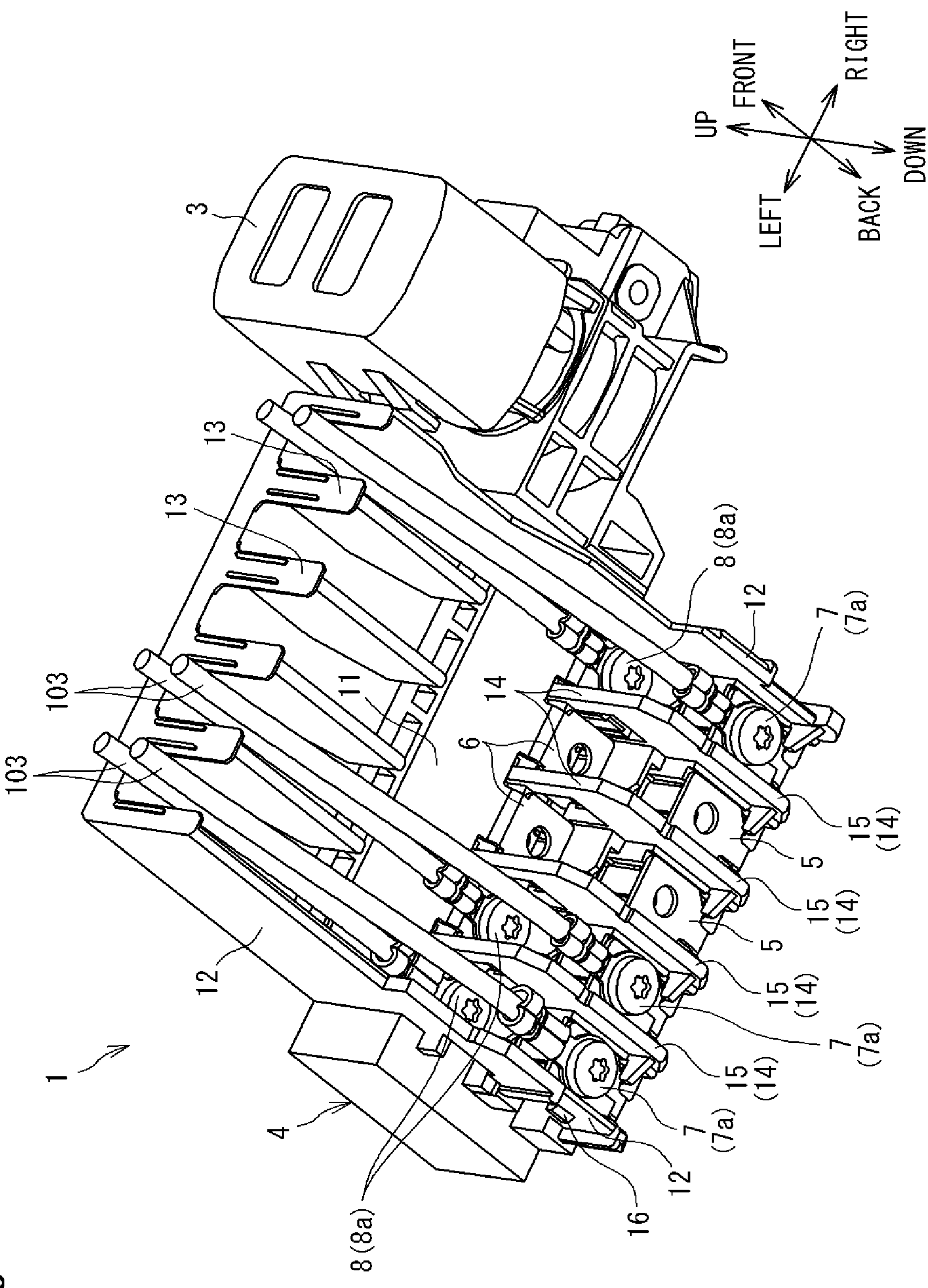
FIG. 3 is a perspective view of the electrical junction box in which a first cover member and a second cover member are removed therefrom.

FIG. 3 is a perspective view of the electrical junction box 1 in which the first cover member 20 and the second cover member 40 are removed therefrom. In FIG. 2 and FIG. 3, the electrical junction box 1 of the present embodiment includes five first conductive plates 5 and five second conductive plates 6. The number of the first bolts 7 is equal to that of the first conductive plates 5. The number of the second bolts 8 is equal to that of the second conductive plates 6. In FIG. 2 and FIG. 3, for convenience, the second and third first bolts 7 and the second and third second bolts 8 from the right are not shown (the same applies to FIG. 5 and FIG. 11).

The terminal block 4 is, for example, an insulator made of synthetic resin. The terminal block 4 includes a base 11, a pair of side walls 12, a plurality of guide plates 13, and a plurality of partition plates 14. The base 11 is formed, for example, in a substantially rectangular parallelepiped shape. The side walls 12 are provided on the right and left sides of the base 11, respectively. The connector 3 is provided on the side wall 12 on one side (the right side in FIG. 2).

The plurality of guide plates 13 are provided between the pair of side walls 12 at the front side of the base 11 so as to be spaced apart from each other in the right-left direction and project downward. In the present embodiment, four guide plates 13 are provided in the base 11. The electric wires 103 are placed between the adjacent guide plates 13 and between each side wall 12 and the guide plate 13 adjacent thereto.

The plurality of partition plates 14 are provided between the pair of side walls 12 at the back side of the base 11 so as to be spaced apart from each other in the right-left direction and project downward. In the present embodiment, four partition plates 14 are provided in the base 11. Each partition plate 14 has a function of insulating the adjacent first conductive plates 5 from each other.

The first conductive plates 5 and the second conductive plates 6 are, for example, conductors made of metal, and are also referred to as busbars. Each of the plurality of first conductive plates 5 is provided between the adjacent partition plates 14 or between each side wall 12 and the partition plate 14 adjacent thereto in the base 11. The plurality of first conductive plates 5 are placed at the back side of the base 11 so as to be aligned in a row in the right-left direction (row direction). The electric wire 103 is electrically connected to the lower surface of each first conductive plate 5.

Each of the plurality of second conductive plates 6 is provided between the adjacent partition plates 14 or between each side wall 12 and the partition plate 14 adjacent thereto in the base 11. In the present embodiment, the plurality of second conductive plates 6 are placed at positions, slightly shifted to the front side and the upper side from the first conductive plates 5 in the base 11, so as to be aligned in a row in the right-left direction (another row direction). Accordingly, the plurality of second conductive plates 6 are placed on the internal side of the terminal block 4 with respect to the plurality of first conductive plates 5 so as to be parallel to the plurality of first conductive plates 5. The electric wire 103 is electrically connected to the lower surface of each second conductive plate 6.

The first bolts 7 and the second bolts 8 are, for example, conductors made of metal. The plurality of first bolts 7 and the plurality of second bolts 8 are tightened to the terminal block 4 from below. Specifically, the plurality of first bolts 7 are tightened from below the electric wires 103 placed on the lower surfaces of the first conductive plates 5, respectively. A head 7*a* of each first bolt 7 tightens and fixes the electric wire 103 between the head 7*a* and the lower surface of the first conductive plate 5 (also see FIG. 5). Similarly, the plurality of second bolts 8 are tightened from below the electric wires 103 placed on the lower surfaces of the second conductive plates 6, respectively. A head 8*a* of each second bolt 8 tightens and fixes the electric wire 103 between the head 8*a* and the lower surface of the second conductive plate 6 (also see FIG. 11).

Due to the above, the respective electric wires 103 which are electrically connected to the first conductive plates 5 and the second conductive plates 6, respectively, are fixed to the terminal block 4 by the first bolts 7 and the second bolts 8. In addition, the heads 8*a* of the plurality of second bolts 8 are placed on the internal side of the terminal block 4 (upper side) with respect to the heads 7*a* of the plurality of first bolts 7 in a state where each electric wire 103 is fixed to the terminal block 4 as described above.

The first cover member 20 and the second cover member 40 are, for example, insulators made of synthetic resin. The first cover member 20 is attached to the terminal block 4 in a state where the first cover member 20 covers the heads 7*a* of the plurality of first bolts 7 from below. The second cover member 40 is attached to the terminal block 4 in a state where the second cover member 40 covers the heads 8*a* of the plurality of second bolts 8 from below. The second cover member 40 of the present embodiment covers the heads 8*a* of the plurality of second bolts 8 from below in a state where the second cover member 40 is inserted from a lateral side of the terminal block 4 (left side in the illustrated example) into the internal side of the terminal block 4.

Configurations of First Cover Member and Surroundings Thereof

As shown in FIG. 3, the terminal block 4 has a plurality of (four in FIG. 3) lower projection portions 15 which project downward with respect to the heads 7*a* of the plurality of first bolts 7. In the present embodiment, the lower projection portions 15 are formed so as to be integrated with lower end portions of the partition plates 14, respectively. Accordingly, each lower projection portion 15 of the present embodiment is a part of the partition plate 14. A lateral projection portion 16 is provided on the outer surface of each side wall 12 of the terminal block 4 so as to project laterally (also see FIG. 5). The first cover member 20 is attached to the lower projection portions 15 and the lateral projection portions 16. The details thereof will be described below.

Figure 4:
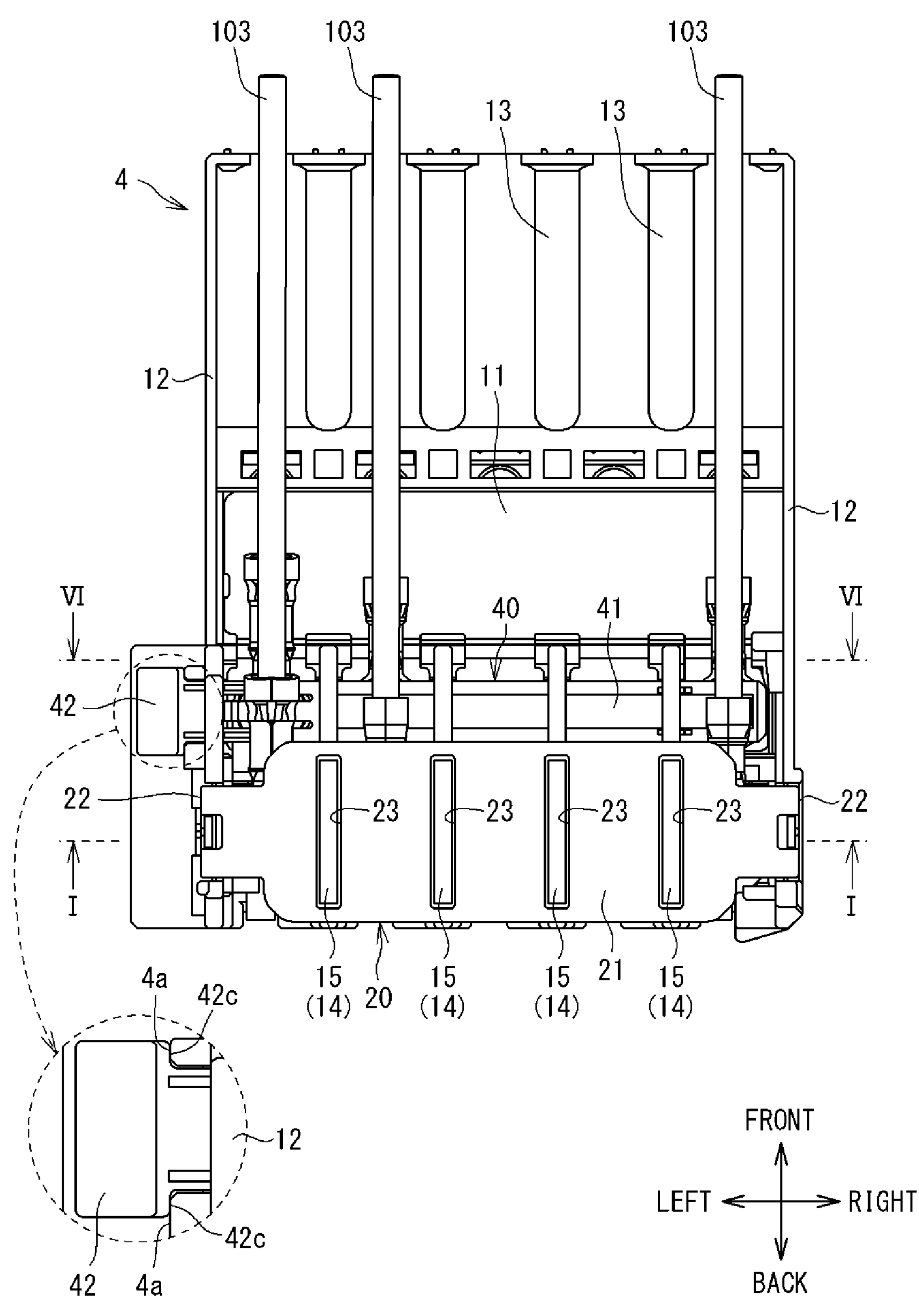
FIG. 4 is a plan view of a terminal block as seen from below.
Figure 5:
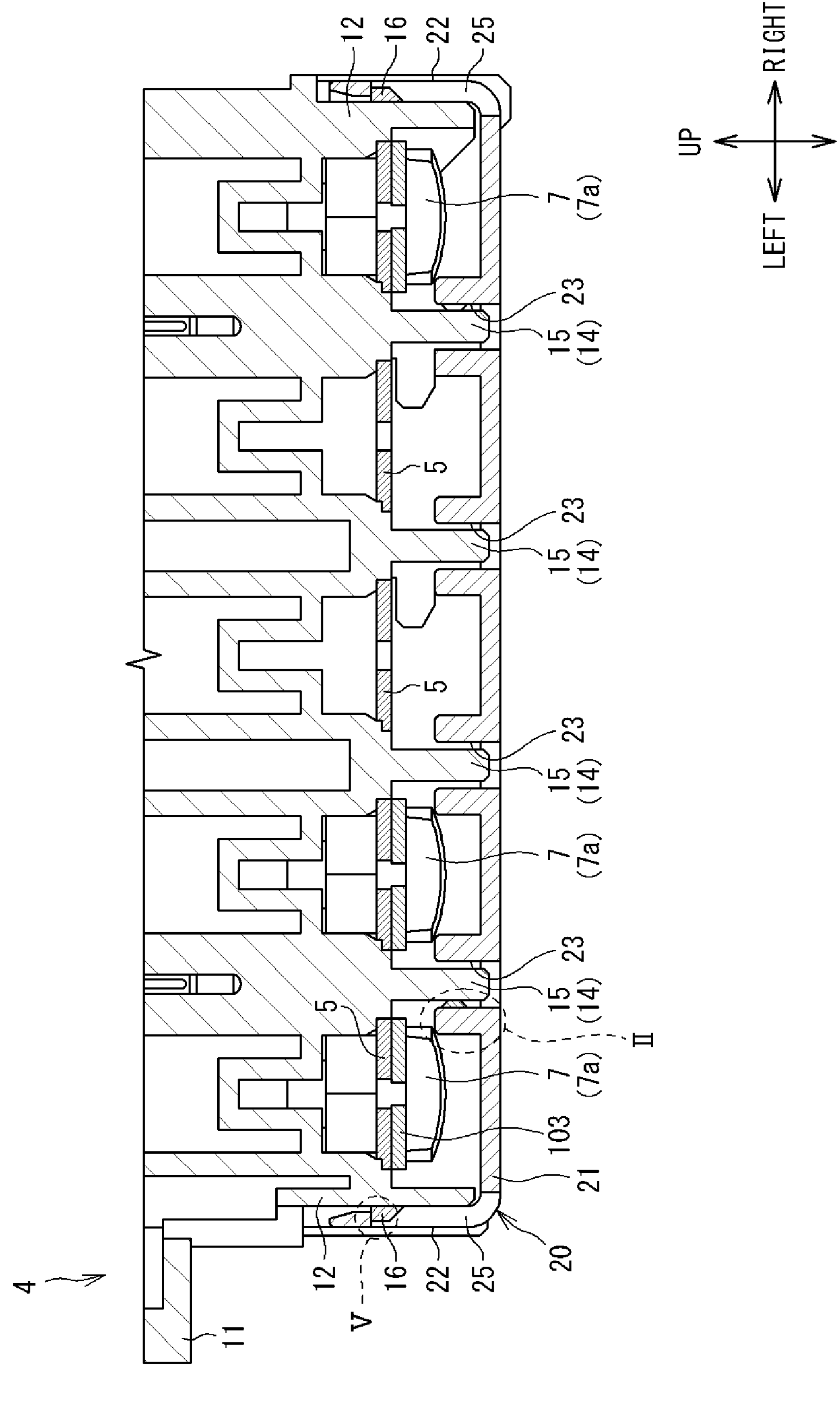
FIG. 5 is a cross-sectional view as seen in the direction of arrows I-I in FIG. 4.

FIG. 4 is a plan view of the terminal block 4 as seen from below. FIG. 5 is a cross-sectional view as seen in the direction of arrows I-I in FIG. 4. In FIG. 4 and FIG. 5, the first cover member 20 is composed of, for example, a flat plate member that is bent at right and left end portions thereof. Specifically, the first cover member 20 has a first cover main body 21 which extends in the right-left direction, and a pair of right and left first cover side bodies 22 which extend in the up-down direction. The first cover main body 21 is placed on a lower end portion of the terminal block 4 at a position where the first cover main body 21 covers the heads 7*a* of the plurality of first bolts 7. The first cover side bodies 22 extend upward from the right and left ends of the first cover main body 21, respectively. Each first cover side body 22 is placed along the outer surface of the side wall 12 on the lateral side of the terminal block 4.

Figure 6:
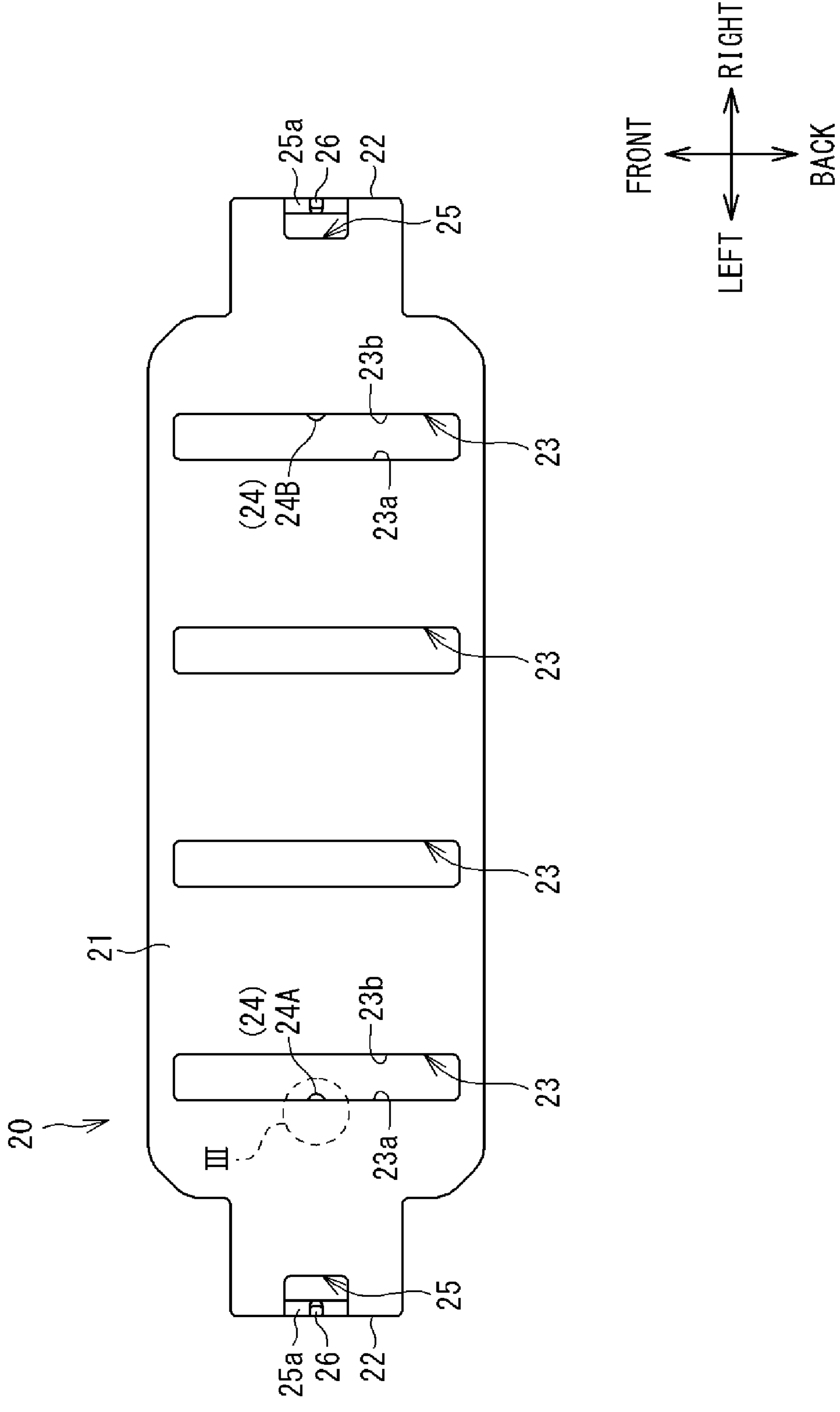
FIG. 6 is a plan view of the first cover member as seen from below.

FIG. 6 is a plan view of the first cover member 20 as seen from below. In FIG. 5 and FIG. 6, a plurality of (four in the illustrated example) lower fitting holes 23 are formed in the first cover main body 21 of the first cover member 20 so as to be spaced apart from each other in the right-left direction and penetrate therethrough in the up-down direction. Each lower fitting hole 23 is formed, for example, in a substantially rectangular shape that is long in the front-back direction in a plan view. The lower projection portions 15 of the partition plates 14 are fitted into the plurality of lower fitting holes 23, respectively, from above. By attaching the first cover main body 21 to the terminal block 4 with such a fitting configuration, the dimension in the up-down direction of the electrical junction box 1 can be reduced.

The first cover member 20 has a plurality of side surface contact portions 24 which are provided in predetermined lower fitting holes 23. The first cover main body 21 of the present embodiment has a side surface contact portion 24A which is provided on a side surface 23*a* on the left side of the leftmost lower fitting hole 23, and a side surface contact portion 24B which is provided on a side surface 23*b* on the right side of the rightmost lower fitting hole 23, as the plurality of side surface contact portions 24. The side surface contact portion 24A is provided at a center portion in the front-back direction of the side surface 23*a* so as to project toward the right side. The side surface contact portion 24B is provided at a center portion in the front-back direction of the side surface 23*b* so as to project toward the left side. The side surface contact portion 24A and the side surface contact portion 24B have shapes that are bilaterally symmetrical to each other, and thus the side surface contact portion 24A will be described in detail below.

Figure 7:
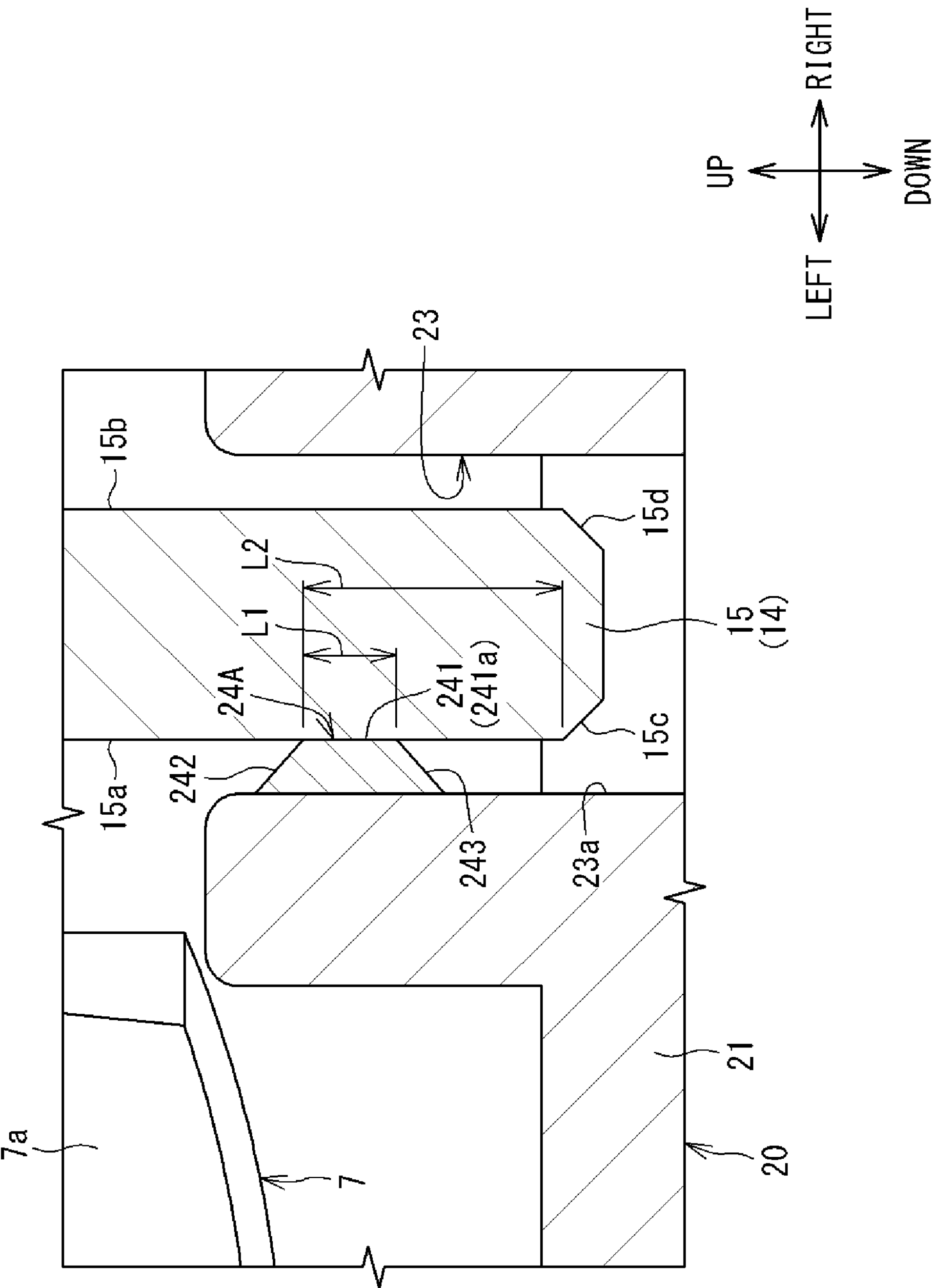
FIG. 7 is an enlarged cross-sectional view of a part II in FIG. 5.

FIG. 7 is an enlarged cross-sectional view of a part II in FIG. 5. In FIG. 7, the side surface contact portion 24A has a projection end surface 241 which comes into contact with a side surface 15*a* on the left side of the lower projection portion 15 in a state where the lower projection portion 15 is fitted into the lower fitting hole 23. The side surface contact portion 24B (see FIG. 5) which is provided in the rightmost lower fitting hole 23 has a projection end surface 241 which comes into contact with a side surface 15*b* on the right side of the lower projection portion 15 which is fitted into this lower fitting hole 23.

A pair of upper and lower inclined surfaces 242 and 243 are formed in the projection end surface 241. Each of the inclined surfaces 242 and 243 of the present embodiment is inclined in a linear shape in the cross-sectional view of FIG. 7. The inclined surface (contact side inclined surface) 242 is inclined toward the side surface 23*a* of the lower fitting hole 23 as extending upward on the upper side of the projection end surface 241. The inclined surface 243 is inclined toward the side surface 23*a* of the lower fitting hole 23 as extending downward on the lower side of the projection end surface 241. Each of the inclined surfaces 242 and 243 may be inclined in an arc shape in the cross-sectional view.

Figure 8:
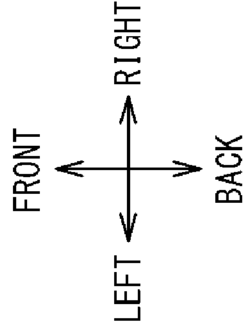
FIG. 8 is an enlarged cross-sectional view of a part III in FIG. 6.
Figure 8:
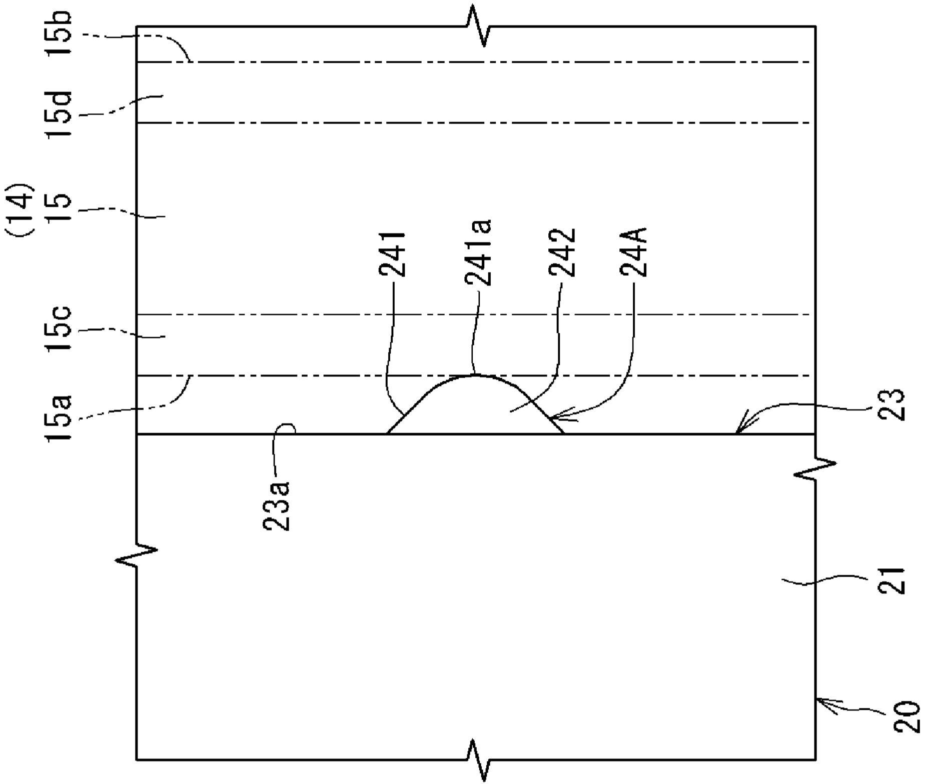

FIG. 8 is an enlarged cross-sectional view of a part III in FIG. 6. In FIG. 7 and FIG. 8, the projection end surface 241 of the side surface contact portion 24A has an arcuate surface 241*a* which is formed in an arc shape in a plan view. The arcuate surface 241*a* of the present embodiment is formed at a center portion in the front-back direction of the projection end surface 241 between the pair of upper and lower inclined surfaces 242 and 243. The arcuate surface 241*a* comes into line contact with the side surface 15*a* of the lower projection portion 15 in the up-down direction.

In FIG. 7, a contact length L1 of the projection end surface 241 of the side surface contact portion 24A is not greater than ½ of a contact length L2 of the side surface 15*a* of the lower projection portion 15. The contact length L1 is a length in the up-down direction by which the projection end surface 241 of the side surface contact portion 24A comes into contact with the side surface 15*a* of the lower projection portion 15 when the lower projection portion 15 is fitted into the lower fitting hole 23. The contact length L2 is a length in the up-down direction by which the side surface 15*a* of the lower projection portion 15 comes into contact with the projection end surface 241 of the side surface contact portion 24A when the lower projection portion 15 is fitted into the lower fitting hole 23.

A pair of left and right inclined surfaces 15*c* and 15*d* are formed on a lower end portion of the lower projection portion 15 such that the thickness in the right-left direction of the lower projection portion 15 gradually decreases. Each of the inclined surfaces 15*c* and 15*d* of the present embodiment is inclined in a linear shape in the cross-sectional view. The inclined surface (projection portion side inclined surface) 15*c* is inclined toward the right side as extending downward at a lower end portion of the side surface 15*a* on the left side of the lower projection portion 15. The inclined surface 15*d* is inclined toward the left side as extending downward at a lower end portion of the side surface 15*b* on the right side of the lower projection portion 15. Each of the inclined surfaces 15*c* and 15*d* may be inclined in an arc shape in the cross-sectional view. In addition, it is sufficient that at least the inclined surface 15*c* is formed on the lower end portion of the lower projection portion 15.

Figure 9:
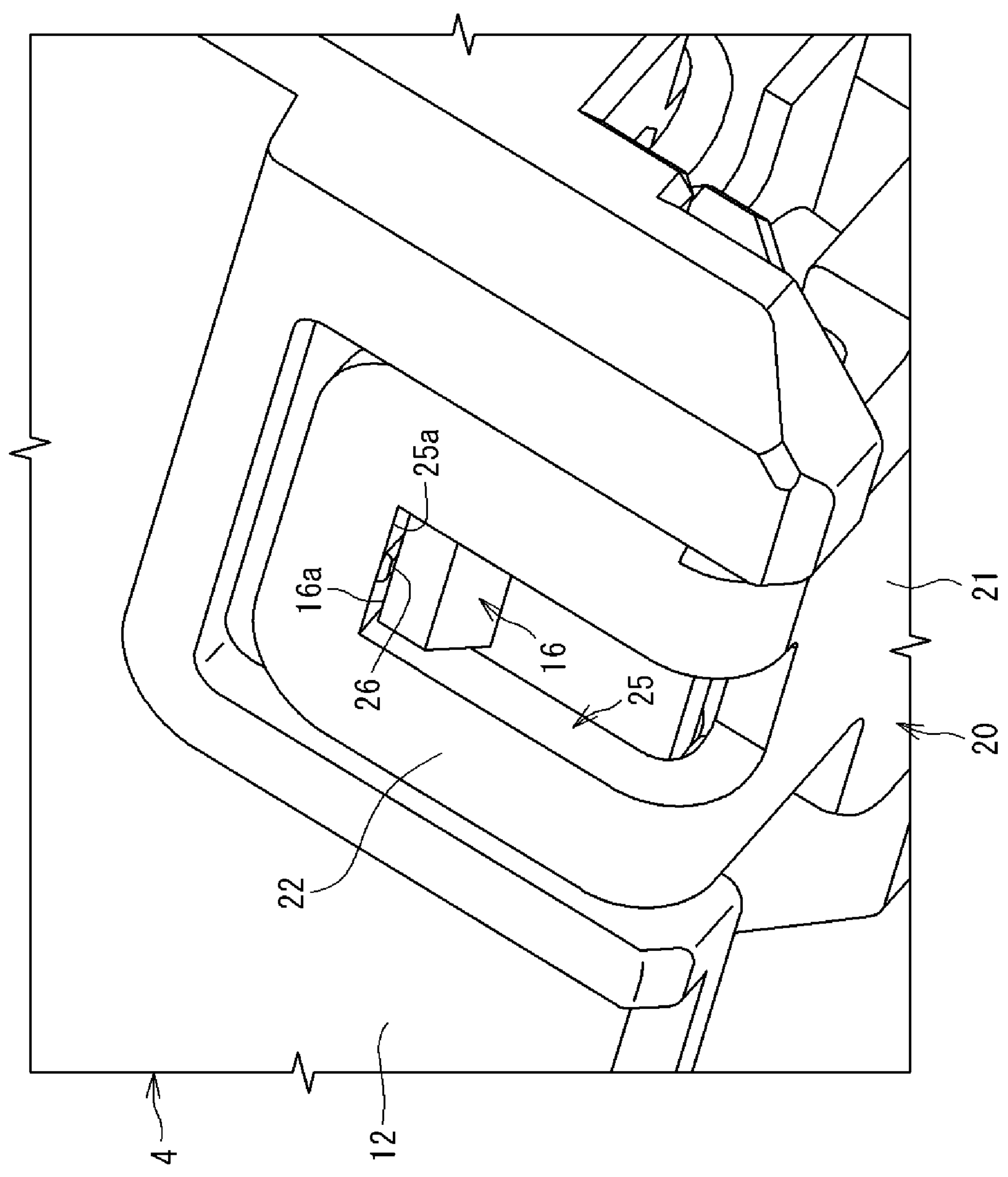
FIG. 9 is an enlarged perspective view of a part IV in FIG. 2.

FIG. 9 is an enlarged perspective view of a part IV in FIG. 2. In FIG. 5 and FIG. 9, a lateral fitting hole 25 is formed in each first cover side body 22 of the first cover member 20 so as to penetrate therethrough in the right-left direction. The lateral fitting holes 25 of the present embodiment are formed from both end portions in the longitudinal direction of the first cover main body 21 to upper end portions of the first cover side bodies 22, respectively. Into the lateral fitting hole 25 of each first cover side body 22, the lateral projection portion 16 of the opposing side wall 12 is fitted from the inner side in the right-left direction. Specifically, the lateral projection portion 16 of the side wall 12 on the left side is fitted into the lateral fitting hole 25 of the first cover side body 22 on the left side from the right side. The lateral projection portion 16 of the side wall 12 on the right side is fitted into the lateral fitting hole 25 of the first cover side body 22 on the right side from the left side.

In FIG. 6 and FIG. 9, the first cover member 20 has an upper surface contact portion 26 which is provided in the lateral fitting hole 25 of each first cover side body 22. The upper surface contact portion 26 is provided so as to project downward from an upper surface 25*a* of the lateral fitting hole 25. The upper surface contact portion 26 of the first cover side body 22 on the left side and the upper surface contact portion 26 of the first cover side body 22 on the right side have shapes that are bilaterally symmetrical to each other, and thus the upper surface contact portion 26 of the first cover side body 22 on the left side will be described in detail below.

Figure 10:
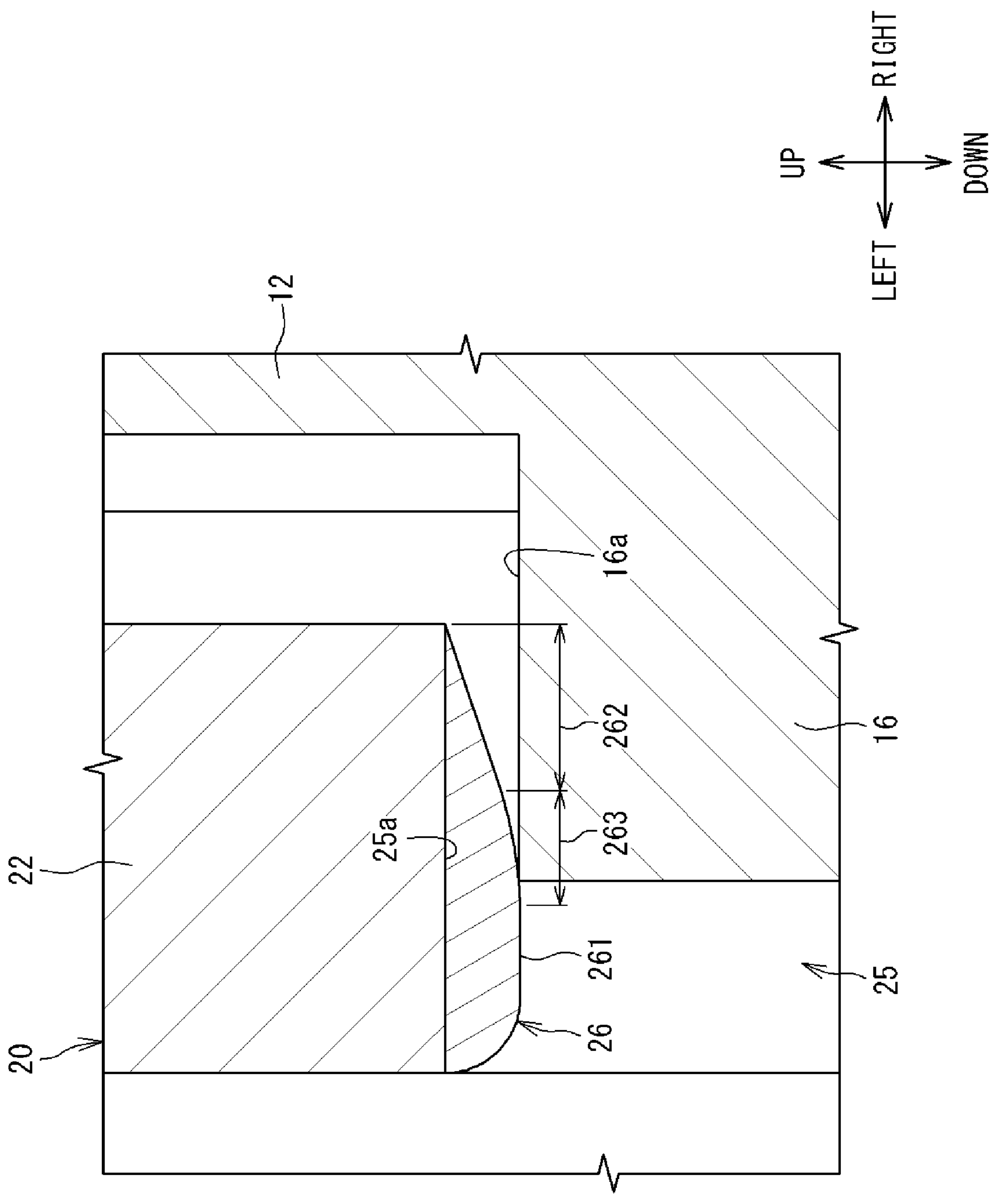
FIG. 10 is an enlarged cross-sectional view of a part V in FIG. 5.

FIG. 10 is an enlarged cross-sectional view of a part V in FIG. 5. In FIG. 10, the upper surface contact portion 26 is formed such that the upper surface contact portion 26 comes into contact with an upper surface 16*a* of the lateral projection portion 16 in a state where the lateral projection portion 16 is fitted into the lateral fitting hole 25. A first inclined surface 262 and a second inclined surface 263 are formed in a lower surface 261 of the upper surface contact portion 26. The first inclined surface 262 of the present embodiment is inclined in a linear shape in the cross-sectional view. Specifically, the first inclined surface 262 is inclined upward toward the right side which is the side opposite to the fitting direction of the lateral projection portion 16, on the right side of the lower surface 261 of the upper surface contact portion 26. The first inclined surface 262 may be inclined in an arc shape in the cross-sectional view.

The second inclined surface 263 is inclined in the same direction as the first inclined surface 262, on the left side with respect to the first inclined surface 262 (the fitting direction side of the lateral projection portion 16). That is, the second inclined surface 263 is inclined upward toward the right side. The second inclined surface 263 of the present embodiment is inclined in an arc shape in the cross-sectional view, and is more gently inclined than the first inclined surface 262. The right end of the second inclined surface 263 is connected to the left end of the first inclined surface 262, and the second inclined surface 263 and the first inclined surface 262 are formed so as to be almost flush with each other. The second inclined surface 263 comes into contact with the upper surface 16*a* of the lateral projection portion 16 when the lateral projection portion 16 is fitted into the lateral fitting hole 25. Each second inclined surface 263 may be inclined in a linear shape in the cross-sectional view.

Configurations of Second Cover Member and Surroundings Thereof

Figure 11:
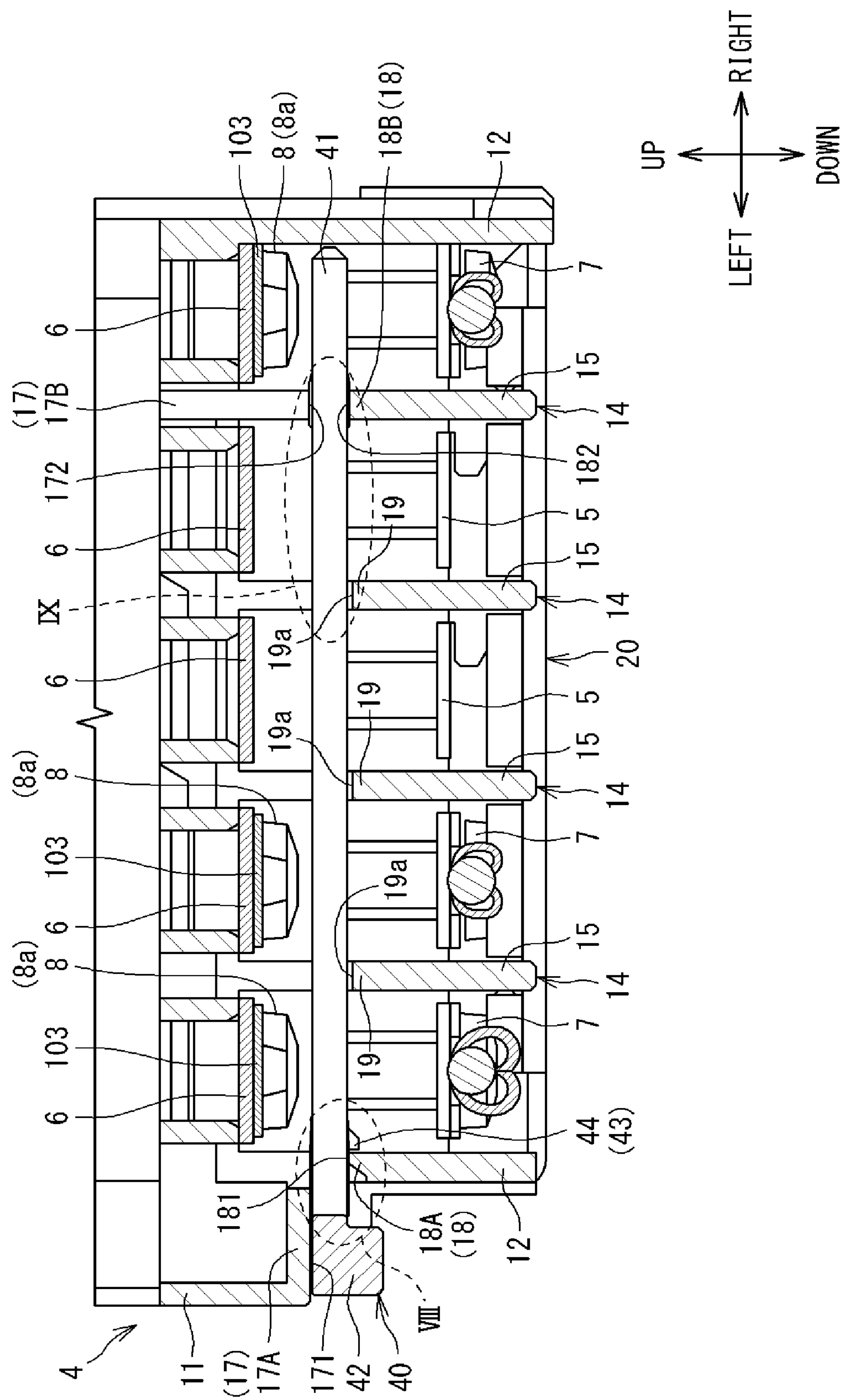
FIG. 11 is a cross-sectional view as seen in the direction of arrows VI-VI in FIG. 4.

FIG. 11 is a cross-sectional view as seen in the direction of arrows VI-VI in FIG. 4. In FIG. 11, the terminal block 4 of the present embodiment has a pair of upper support portions 17, a pair of lower support portions 18, and a plurality of (three in FIG. 11) intermediate support portions 19. The pair of upper support portions 17 support a second cover main body 41 (described later) of the second cover member 40 from above. The pair of lower support portions 18 and the plurality of intermediate support portions 19 support the second cover main body 41 from below.

The pair of upper support portions 17 are placed so as to be spaced apart from each other in the right-left direction. The pair of upper support portions 17 include an upper support portion 17A which is provided on a left end portion of the base 11 and an upper support portion 17B which is provided on a right end portion of the base 11. The upper support portion 17A on the left side is, for example, a flat plate member extending in the right-left direction. The upper support portion 17B on the right side is, for example, a flat plate member extending in the up-down direction. A lower surface 171 of the upper support portion 17A and a lower surface 172 of the upper support portion 17B project downward with respect to the heads 8*a* of the plurality of second bolts 8.

The pair of lower support portions 18 are placed so as to be spaced apart from each other in the right-left direction. The pair of lower support portions 18 include a lower support portion 18A which is provided on the left end portion of the base 11 and a lower support portion 18B which is provided on the right end portion of the base 11. In the present embodiment, the lower support portion 18A is formed so as to be integrated with the side wall 12 on the left side, and is a part of the side wall 12. The lower support portion 18B is formed so as to be integrated with the upper side of the partition plate 14 placed at the right end, and is a part of the partition plate 14. The lower support portion 18A is placed below the upper support portion 17A so as to be spaced apart therefrom. The lower support portion 18B is placed below the upper support portion 17B so as to be spaced apart therefrom.

The plurality of intermediate support portions 19 are placed between the pair of lower support portions 18A and 18B so as to be spaced apart from each other in the right-left direction. The plurality of intermediate support portions 19 have shapes that are identical to each other. Each intermediate support portion 19 of the present embodiment is formed so as to be integrated with an upper end portion of each partition plate 14 (except for the partition plate 14 placed at the right end), and is a part of the partition plate 14.

Figure 12:
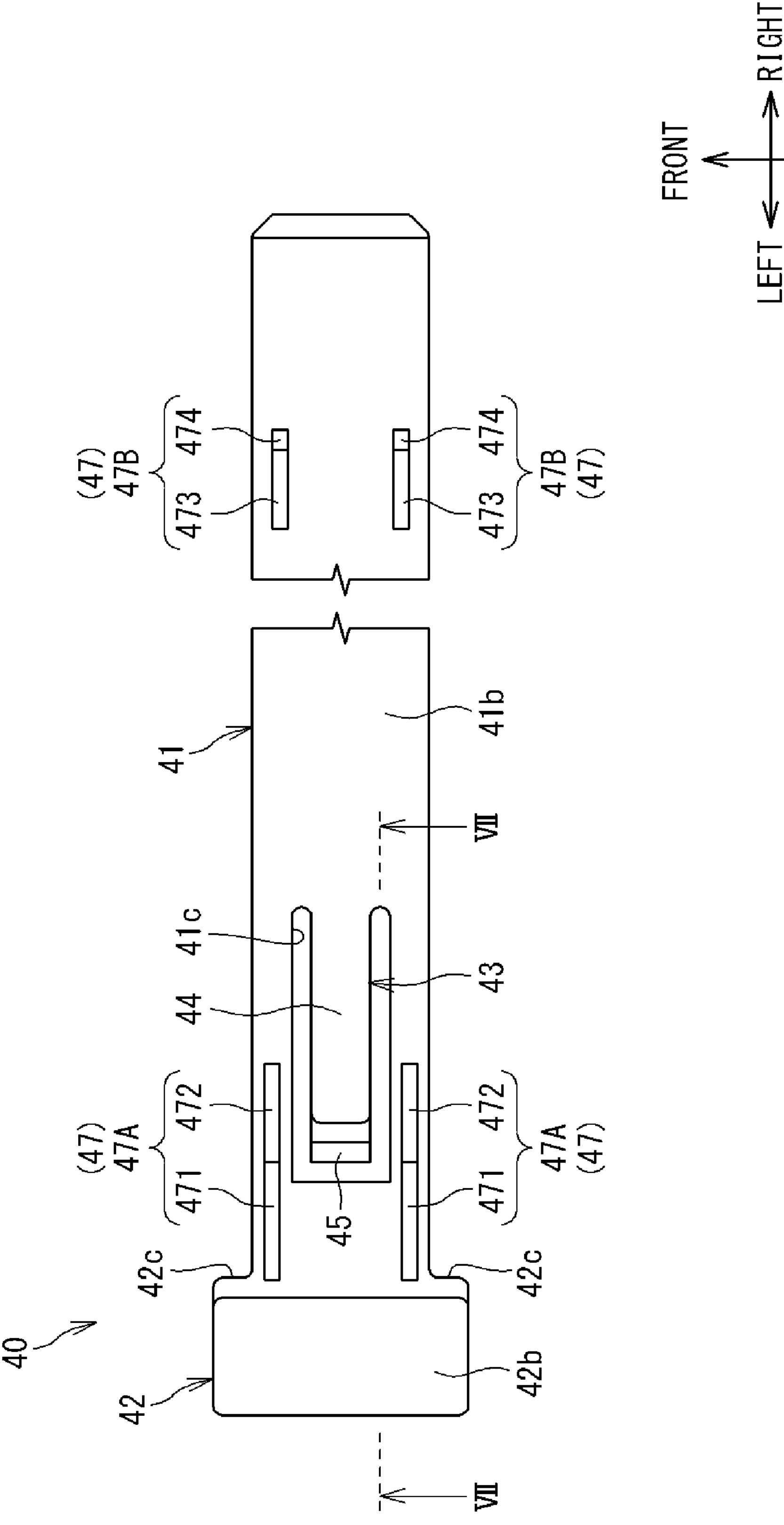
FIG. 12 is a plan view of the second cover member as seen from below.

FIG. 12 is a plan view of the second cover member 40 as seen from below. In FIG. 11 and FIG. 12, the second cover member 40 has the second cover main body 41, a head portion 42, and a restraining portion 43. The second cover main body 41 is, for example, a member having a substantially square rod shape. The second cover main body 41 extends long in the right-left direction so as to cover the heads 8*a* of the plurality of second bolts 8. The thickness in the up-down direction of the second cover main body 41 is slightly smaller than the interval in the up-down direction between the upper support portion 17A and the lower support portion 18A and the interval in the up-down direction between the upper support portion 17B and the lower support portion 18B. Accordingly, the second cover main body 41 passes between the upper support portion 17A and the lower support portion 18A and between the upper support portion 17B and the lower support portion 18B from the left side of the terminal block 4 and is inserted into the internal side of the terminal block 4.

Figure 13:
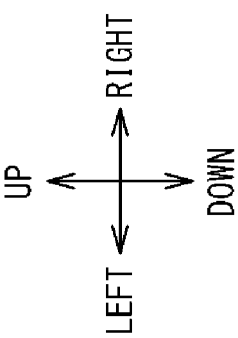
FIG. 13 is a cross-sectional view as seen in the direction of arrows VII-VII in FIG. 12.
Figure 13:
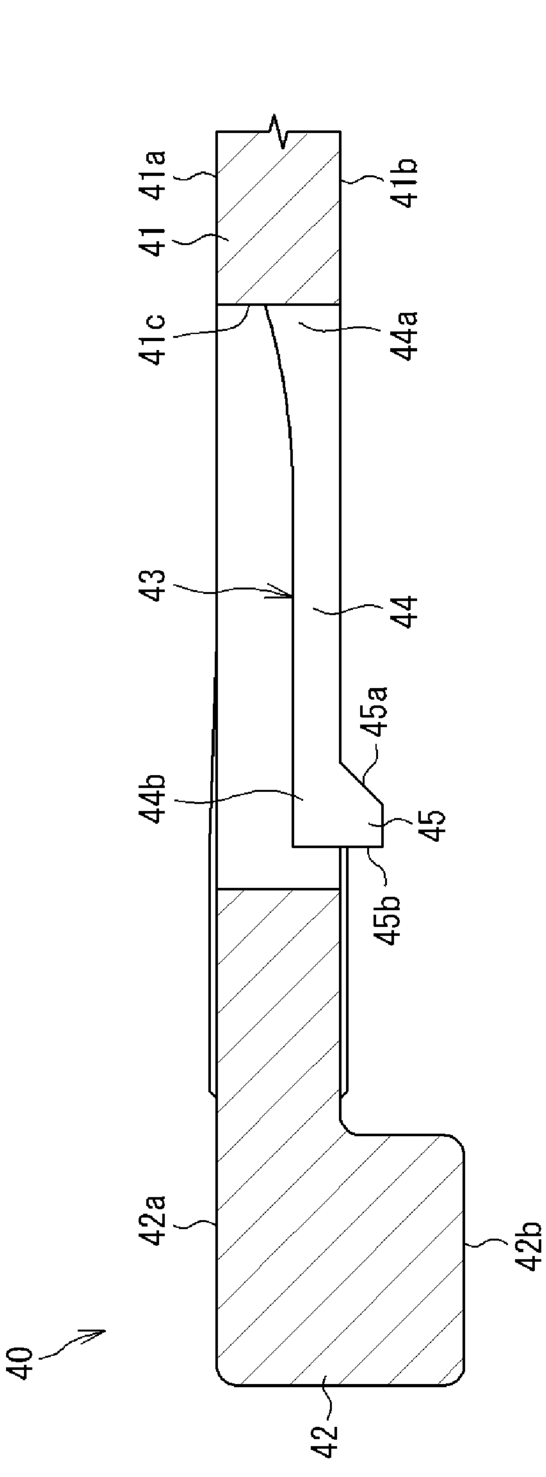

FIG. 13 is a cross-sectional view as seen in the direction of arrows VII-VII in FIG. 12. In FIG. 12 and FIG. 13, the head portion 42 is fixed to one end in the longitudinal direction (here, the left end) of the second cover main body 41. The head portion 42 is a portion that is held when inserting the second cover main body 41 into the terminal block 4. The head portion 42 is formed, for example, in a substantially rectangular parallelepiped shape. An upper surface 42*a* of the head portion 42 is flush with an upper surface 41*a* of the second cover main body 41. A lower surface 42*b* of the head portion 42 projects downward with respect to a lower surface 41*b* of the second cover main body 41.

In FIG. 12, the length in the front-back direction of the head portion 42 is longer than the length in the front-back direction of the second cover main body 41. A pair of contact surfaces 42*c* are formed in the right side surface of the head portion 42 so as to project on both front and back sides, respectively, with respect to the second cover main body 41. As shown in FIG. 4, the pair of contact surfaces 42*c* respectively come into contact with a pair of to-be-contacted portions 4*a*, which are provided to the terminal block 4, when the second cover main body 41 is inserted to a proper position (position shown in FIG. 11) in the terminal block 4. Accordingly, the second cover main body 41 can be prevented from being inserted deeper than the proper position.

In FIG. 12 and FIG. 13, the restraining portion 43 restrains the second cover main body 41 from coming out from a state where the second cover main body 41 is inserted into the terminal block 4. The restraining portion 43 of the present embodiment is formed by cutting out a portion on the left side of the second cover main body 41 into a substantially C-shape in a plan view. The restraining portion 43 has an arm portion 44 which extends in the right-left direction and a projection portion 45 which is provided on the arm portion 44.

A proximal end 44*a* of the arm portion 44 is integrally connected to the second cover main body 41. A distal end 44*b* of the arm portion 44 is separated from the second cover main body 41 by cutting the second cover main body 41 as described above. Accordingly, the distal end 44*b* of the arm portion 44 is elastically deformable so as to swing in the up-down direction with the proximal end 44*a* as a fulcrum.

The projection portion 45 projects downward with respect to the lower surface 41*b* of the second cover main body 41 in a normal state (state shown in FIG. 13) where the arm portion 44 does not swing. The projection portion 45 has an inclined surface 45*a* which is formed on the right side and a stopper surface 45*b* which is formed on the left side. The inclined surface 45*a* is inclined upward in a linear shape toward the right side. The stopper surface 45*b* extends in the up-down direction almost without being inclined.

Owing to the above configuration, when inserting the second cover main body 41 into the terminal block 4, the inclined surface 45*a* of the projection portion 45 in the restraining portion 43 comes into contact with the lower support portion 18A (see FIG. 11) of the terminal block 4, whereby the arm portion 44 of the restraining portion 43 swings upward together with the projection portion 45. Accordingly, the projection portion 45 moves over the lower support portion 18A to the internal side of the terminal block 4. When the projection portion 45 has moved over the lower support portion 18A, the arm portion 44 swings downward to return to the normal state, and the stopper surface 45*b* of the projection portion 45 is placed on the right side of the lower support portion 18A (see FIG. 15). Accordingly, even when the second cover main body 41 moves in a direction in which the second cover main body 41 comes out from the terminal block 4 (to the left side), the second cover main body 41 can be restrained from coming out from the terminal block 4, by the stopper surface 45*b* coming into contact with the side surface of the lower support portion 18A. To pull out the second cover main body 41 from the terminal block 4, the projection portion 45 of the restraining portion 43 is manually pushed upward, whereby the second cover main body 41 can be pulled out from the terminal block 4.

Figure 14:
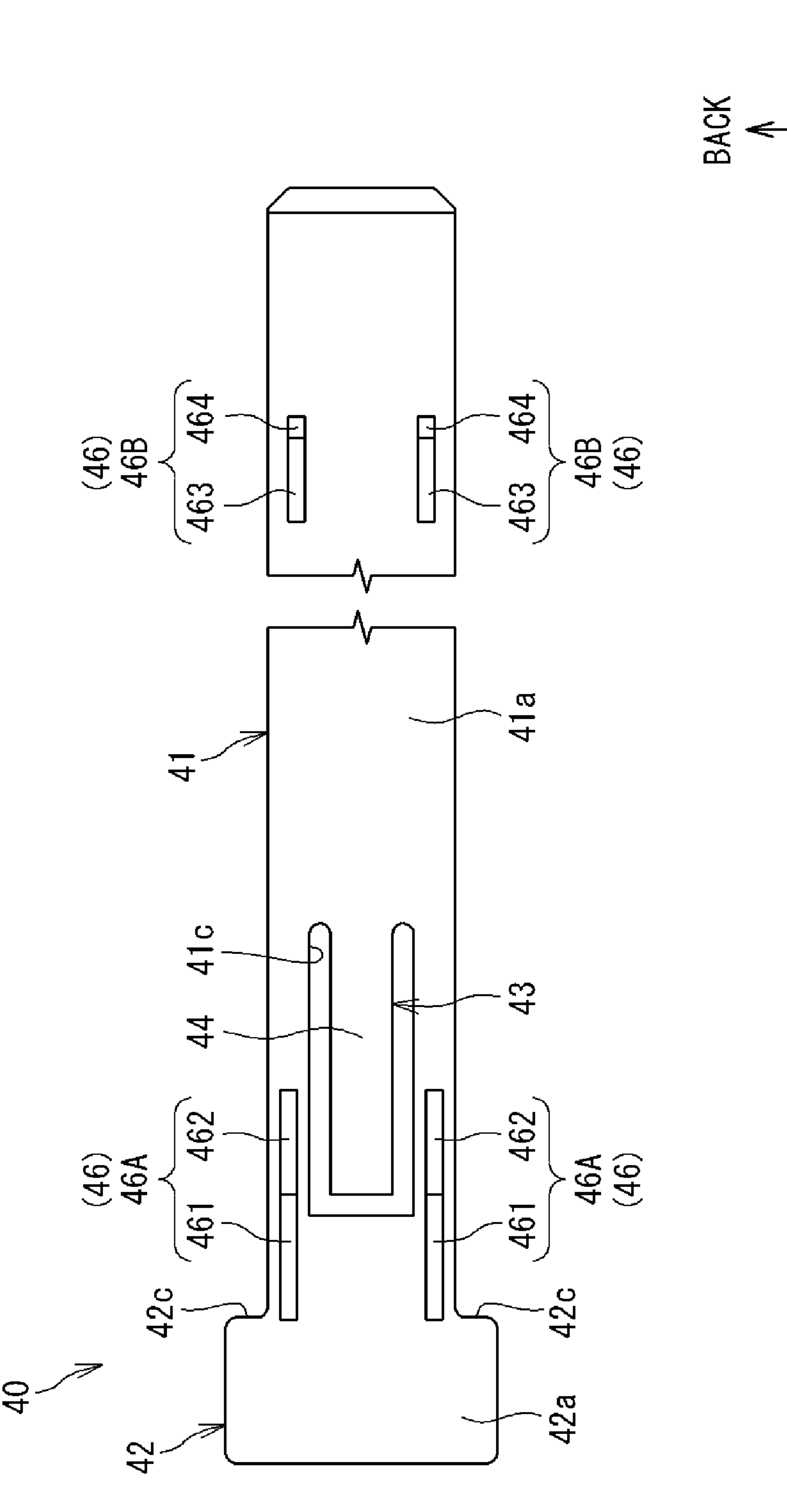
FIG. 14 is a plan view of the second cover member as seen from above.

FIG. 14 is a plan view of the second cover member 40 as seen from above. In FIG. 14, the second cover member 40 has a plurality of upper side contact portions 46 which are provided on the upper surface 41*a* of the second cover main body 41. The second cover member 40 of the present embodiment has a pair of front and back upper side contact portions 46A which are provided on a left end portion of the upper surface 41*a* of the second cover main body 41, and a pair of front and back upper side contact portions 46B which are provided on a right end portion of the upper surface 41*a* of the second cover main body 41, as the plurality of upper side contact portions 46. The pair of upper side contact portions 46A have shapes that are identical to each other. The pair of upper side contact portions 46B also have shapes that are identical to each other.

Figure 15:
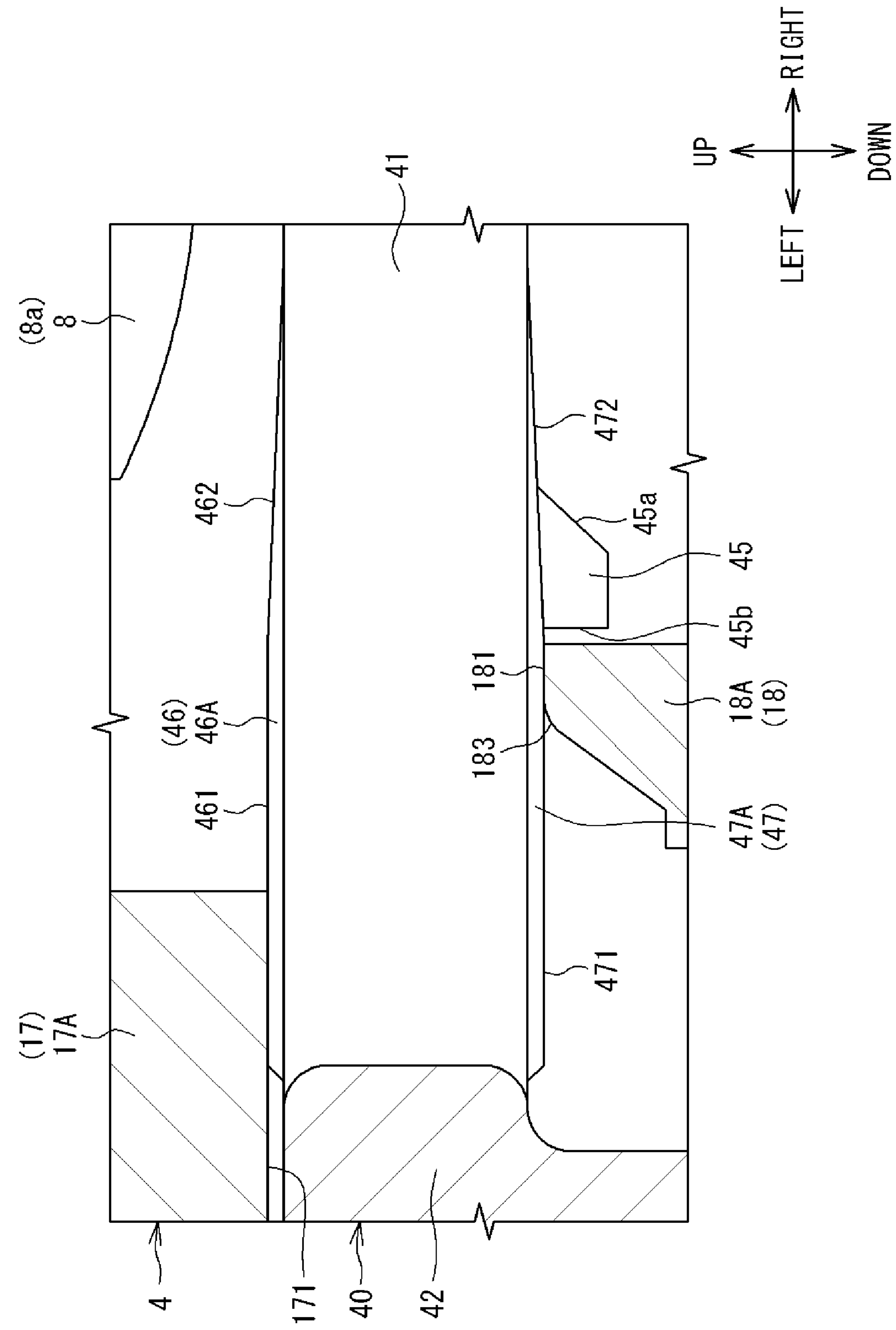
FIG. 15 is an enlarged cross-sectional view of a part VIII in FIG. 11.

FIG. 15 is an enlarged cross-sectional view of a part VIII in FIG. 11. In FIG. 14 and FIG. 15, each upper side contact portion 46A projects upward from the upper surface 41*a* of the second cover main body 41 and extends in the right-left direction. The upper side contact portion 46A has an upper surface 461 which comes into contact with the lower surface 171 of the upper support portion 17A. The upper surface 461 of the upper side contact portion 46A is a flat surface parallel to the lower surface 171 of the upper support portion 17A, and is formed such that a portion (left side portion) of the upper surface 461 comes into surface contact with the lower surface 171 of the upper support portion 17A.

An upper side inclined surface 462 is formed on the right side of the upper surface 461 of the upper side contact portion 46A. The upper side inclined surface 462 of the present embodiment is inclined in a linear shape in a side view of FIG. 15. The upper side inclined surface 462 is inclined downward toward the right side (insertion end side) of the second cover main body 41. The upper side inclined surface 462 may be inclined in an arc shape in the side view.

Figure 16:
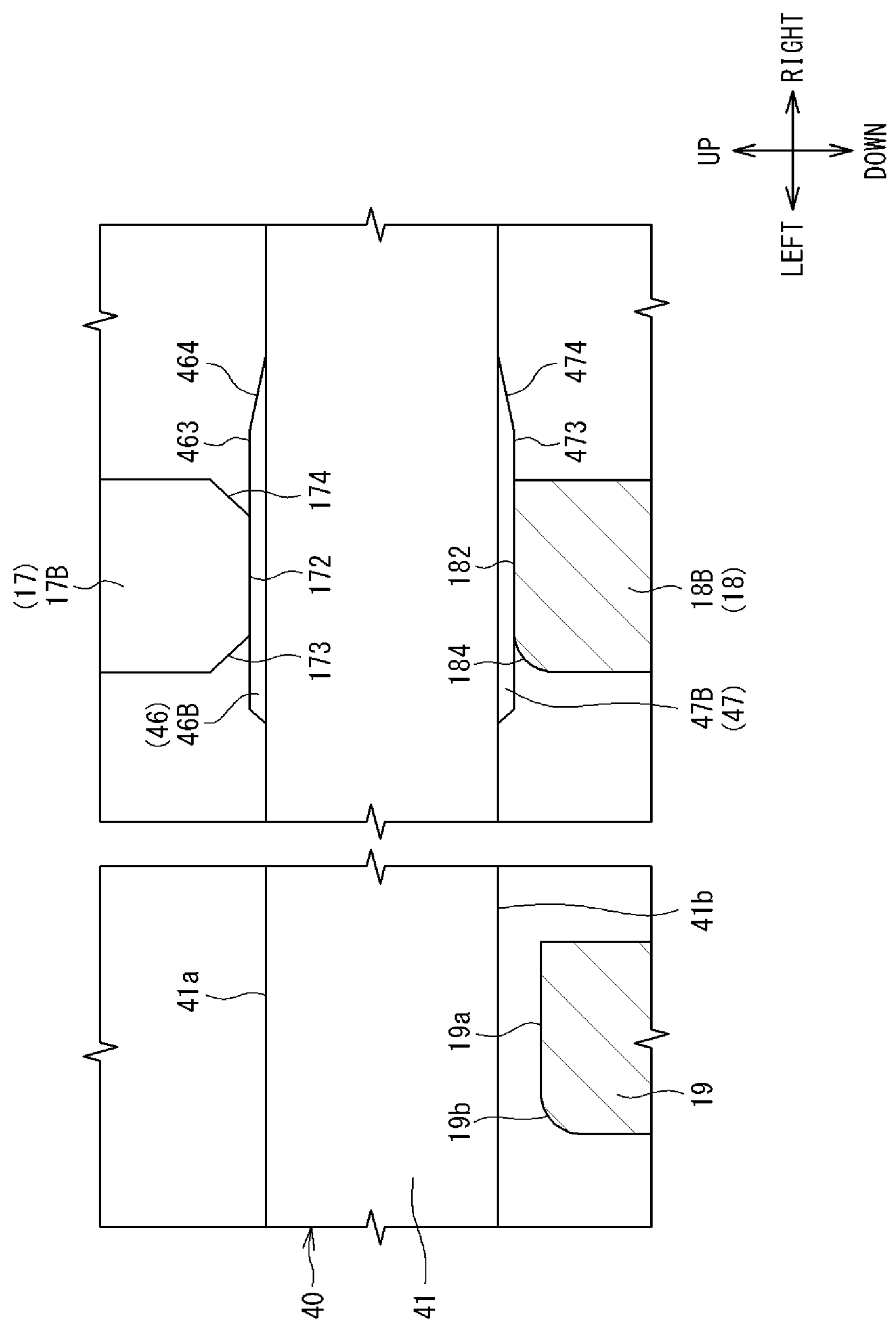
FIG. 16 is an enlarged cross-sectional view of a part IX in FIG. 11.

FIG. 16 is an enlarged cross-sectional view of a part IX in FIG. 11. In FIG. 14 and FIG. 16, each upper side contact portion 46B projects upward from the upper surface 41*a* of the second cover main body 41 and extends in the right-left direction. The upper side contact portion 46B has an upper surface 463 which comes into contact with the lower surface 172 of the upper support portion 17B. The upper surface 463 of the upper side contact portion 46B is a flat surface parallel to the lower surface 172 of the upper support portion 17B, and is formed such that a portion (intermediate portion in the right-left direction) of the upper surface 463 comes into surface contact with the lower surface 172 of the upper support portion 17B.

An upper side inclined surface 464 is formed on the right side of the upper surface 463 of the upper side contact portion 46B. The upper side inclined surface 464 of the present embodiment is inclined in a linear shape in a side view of FIG. 16. The upper side inclined surface 464 is inclined downward toward the right side (insertion end side) of the second cover main body 41. The upper side inclined surface 464 may be inclined in an arc shape in the side view.

In FIG. 16, a pair of left and right inclined surfaces 173 and 174 are formed in the lower surface 172 of the upper support portion 17B. Each of the inclined surfaces 173 and 174 of the present embodiment is inclined in a linear shape in the side view. The inclined surface (upper support side inclined surface) 173 is inclined upward toward the side (left side) opposite to the insertion direction of the second cover main body 41. The inclined surface 174 is inclined upward toward the insertion direction of the second cover main body 41 (right side). Each of the inclined surfaces 173 and 174 may be inclined in an arc shape in the side view. In addition, it is sufficient that at least the inclined surface 173 is formed in the lower surface 172 of the upper support portion 17B.

In FIG. 12, the second cover member 40 has lower side contact portions 47 which are provided on the lower surface 41*b* of the second cover main body 41. The second cover member 40 of the present embodiment has a pair of front and back lower side contact portions 47A which are provided on a left end portion of the lower surface 41*b* of the second cover main body 41, and a pair of front and back lower side contact portions 47B which are provided on a right end portion of the lower surface 41*b* of the second cover main body 41, as a plurality of the lower side contact portions 47. The pair of lower side contact portions 47A have shapes that are identical to each other, and are formed so as to be vertically symmetrical with the upper side contact portions 46A. The pair of lower side contact portions 47B have shapes that are identical to each other, and are formed so as to be vertically symmetrical with the upper side contact portions 46B.

In FIG. 12 and FIG. 15, each lower side contact portion 47A projects downward from the lower surface 41*b* of the second cover main body 41 and extends in the right-left direction. The lower side contact portion 47A has a lower surface 471 which comes into contact with an upper surface 181 of the lower support portion 18A. The lower surface 471 of the lower side contact portion 47A is a flat surface parallel to the upper surface 181 of the lower support portion 18A, and is formed such that a portion (right side portion) of the lower surface 471 comes into surface contact with the upper surface 181 of the lower support portion 18A.

A lower side inclined surface 472 is formed on the right side of the lower surface 471 of the lower side contact portion 47A. The lower side inclined surface 472 of the present embodiment is inclined in a linear shape in the side view of FIG. 15. The lower side inclined surface 472 is inclined upward toward the right side (insertion end side) of the second cover main body 41. The lower side inclined surface 472 may be inclined in an arc shape in the side view.

In FIG. 12 and FIG. 16, each lower side contact portion 47B projects downward from the lower surface 41*b* of the second cover main body 41 and extends in the right-left direction. The lower side contact portion 47B has a lower surface 473 which comes into contact with an upper surface 182 of the lower support portion 18B. The lower surface 473 of the lower side contact portion 47B is a flat surface parallel to the upper surface 182 of the lower support portion 18B, and is formed such that a portion (intermediate portion in the right-left direction) of the lower surface 473 comes into surface contact with the upper surface 182 of the lower support portion 18B.

A lower side inclined surface 474 is formed on the right side of the lower surface 473 of the lower side contact portion 47B. The lower side inclined surface 474 of the present embodiment is inclined in a linear shape in the side view of FIG. 16. The lower side inclined surface 474 is inclined upward toward the right side (insertion end side) of the second cover main body 41. The lower side inclined surface 474 may be inclined in an arc shape in the side view.

In FIG. 15, an inclined surface (lower support side inclined surface) 183 is formed in the upper surface 181 of the lower support portion 18A. The inclined surface 183 of the present embodiment is inclined in an arc shape in the side view. The inclined surface 183 is inclined downward toward the side (left side) opposite to the insertion direction of the second cover main body 41. The inclined surface 183 may be inclined in a linear shape in the side view.

In FIG. 16, an inclined surface (lower support side inclined surface) 184 is formed in the upper surface 182 of the lower support portion 18B. The inclined surface 184 of the present embodiment is inclined in an arc shape in the side view. The inclined surface 184 is inclined downward toward the side (left side) opposite to the insertion direction of the second cover main body 41. The inclined surface 184 may be inclined in a linear shape in the side view.

In FIG. 11 and FIG. 16, an upper surface 19*a* of each intermediate support portion 19 is located below the upper surface 181 of the lower support portion 18A and the upper surface 182 of the lower support portion 18B. Accordingly, the gap between the upper surface 19*a* of the intermediate support portion 19 and the lower surface 41*b* of the second cover main body 41 is larger than the gaps between the upper surfaces 181 and 182 of the lower support portions 18A and 18B and the lower surface 41*b* of the second cover main body 41.

In FIG. 16, an inclined surface (intermediate inclined surface) 19*b* is formed in the upper surface 19*a* of the intermediate support portion 19. The inclined surface 19*b* of the present embodiment is inclined in an arc shape in the side view. The inclined surface 19*b* is inclined downward toward the side (left side) opposite to the insertion direction of the second cover main body 41.

Advantageous Effects of the Present Embodiment

In the electrical junction box 1 of the present embodiment, the heads 7*a* of the plurality of first bolts 7 which fix the electric wires 103 electrically connected to the first conductive plates 5, to the terminal block 4, are covered with the first cover member 20 from below. In addition, the heads 8*a* of the plurality of second bolts 8 which fix the electric wires 103 electrically connected to the second conductive plates 6, to the terminal block 4, are covered with the second cover member 40 from below. Accordingly, even if the first bolt 7 becomes loose with respect to the terminal block 4, the head 7*a* of the first bolt 7 comes into contact with the first cover member 20, whereby the first bolt 7 can be inhibited from falling off from the terminal block 4. Similarly, even if the second bolt 8 becomes loose with respect to the terminal block 4, the head 8*a* of the second bolt 8 comes into contact with the second cover member 40, whereby the second bolt 8 can be inhibited from falling off from the terminal block 4. In addition, the first cover member 20 and the second cover member 40 collectively cover the heads 7*a* of the plurality of first bolts 7 and the heads 8*a* of the plurality of second bolts 8, respectively. Therefore, the number of components is reduced, so that the configuration of the electrical junction box 1 can be simplified.

Since the second cover member 40 is inserted from the lateral side into the internal side of the terminal block 4, even when the heads 8*a* of the second bolts 8 are located on the internal side of the terminal block 4 with respect to the heads 7*a* of the first bolts 7, the heads 8*a* of the second bolts 8 can be covered with the second cover member 40.

The side surface contact portion 24 is provided on each of the side surfaces 23*a* and 23*b* of the lower fitting holes 23 of the first cover main body 21 so as to come into contact with the side surface 15*a* or 15*b* of the lower projection portion 15 in a state where the lower projection portion 15 of the terminal block 4 is fitted into the lower fitting hole 23. Therefore, even if a dimensional error occurs in any of the lower projection portion 15 of the terminal block 4 and the lower fitting hole 23 of the first cover main body 21, when the lower projection portion 15 is fitted into the lower fitting hole 23, the side surface contact portion 24 can be brought into contact with the side surface 15*a* of the lower projection portion 15. Accordingly, the first cover member 20 can be inhibited from rattling in the right-left direction with respect to the lower projection portion 15, so that generation of abnormal sound due to such rattling can be suppressed.

Each lower projection portion 15 of the terminal block 4 is a part of the partition plate 14 which insulates the adjacent first bolts 7 from each other. Accordingly, the terminal block 4 does not have to have the lower projection portion 15 separately provided therein, so that the configuration of the electrical junction box 1 can be further simplified.

The inclined surfaces 15*c* and 15*d* are formed in the side surfaces 15*a* and 15*b* of the lower projection portion 15 so as to be inclined such that the thickness in the right-left direction of the lower projection portion 15 gradually decreases. Accordingly, the lower projection portion 15 can be smoothly fitted into the lower fitting hole 23 of the first cover main body 21.

The inclined surface 242 is formed in the projection end surface 241 of the side surface contact portion 24 so as to be inclined toward the side surface 23*a* of the lower fitting hole 23 as extending upward. Accordingly, the lower projection portion 15 can be further smoothly fitted into the lower fitting hole 23 of the first cover main body 21.

The projection end surface 241 of the side surface contact portion 24 has the arcuate surface 241*a* which comes into line contact with the side surface 15*a* of the lower projection portion 15. Therefore, the contact surface pressure between the side surface contact portion 24 and the lower projection portion 15 can be increased as compared to the case where the side surface contact portion 24 comes into surface contact with the side surface 15*a* of the lower projection portion 15. Accordingly, the first cover member 20 can be further inhibited from rattling in the right-left direction with respect to the lower projection portion 15.

The contact length L1 in the up-down direction by which the projection end surface 241 of the side surface contact portion 24 comes into contact with the side surface 15*a* of the lower projection portion 15 is not greater than ½ of the contact length L2 in the up-down direction by which the side surface 15*a* of the lower projection portion 15 comes into contact with the projection end surface 241. Accordingly, the contact length L1 is shortened, so that the lower projection portion 15 can be further smoothly fitted into the lower fitting hole 23.

The upper surface contact portion 26 is provided on the upper surface 25*a* of the lateral fitting hole 25 of each first cover side body 22 so as to come into contact with the upper surface 16*a* of the lateral projection portion 16 in a state where the lateral projection portion 16 of the terminal block 4 is fitted into the lateral fitting hole 25. Therefore, even if a dimensional error occurs in any of the lateral projection portion 16 of the terminal block 4 and the lateral fitting hole 25 of the first cover side body 22, the upper surface contact portion 26 can be brought into contact with the upper surface 16*a* of the lateral projection portion 16 when the lateral projection portion 16 is fitted into the lateral fitting hole 25. Accordingly, the first cover member 20 can be inhibited from rattling in the up-down direction with respect to the lateral projection portion 16, so that generation of abnormal sound due to such rattling can be suppressed.

The first inclined surface 262 is formed in the lower surface 261 of the upper surface contact portion 26 so as to be inclined upward toward the right side. Accordingly, the lateral projection portion 16 can be smoothly fitted into the lateral fitting hole 25 of the first cover side body 22.

The second inclined surface 263 is formed in the lower surface 261 of the upper surface contact portion 26 so as to be inclined in the same direction as the first inclined surface 262 on the left side with respect to the first inclined surface 262 and come into contact with the upper surface 16*a* of the lateral projection portion 16. The reliability for the upper surface contact portion 26 to come into contact with the lateral projection portion 16 can be increased by the second inclined surface 263.

The second inclined surface 263 of the upper surface contact portion 26 is more gently inclined than the first inclined surface 262. Since the second inclined surface 263 which is gently inclined comes into contact with the lateral projection portion 16, a state where the upper surface contact portion 26 and the lateral projection portion 16 are in contact with each other is easily maintained. Accordingly, the lateral projection portion 16 can be inhibited from being removed from the lateral fitting hole 25.

The upper side contact portions 46 are provided on the upper surface 41*a* of the second cover main body 41 so as to come into contact with the lower surfaces 171 and 172 of the upper support portions 17 of the terminal block 4. In addition, the lower side contact portions 47 are provided on the lower surface 41*b* of the second cover main body 41 so as to come into contact with the upper surfaces 181 and 182 of the lower support portions 18 of the terminal block 4. Therefore, even if a dimensional error occurs in any of the upper support portions 17 and the lower support portions 18 of the terminal block 4 and the second cover main body 41, the upper side contact portions 46 can be brought into contact with the lower surfaces 171 and 172 of the upper support portions 17, and the lower side contact portions 47 can be brought into contact with the upper surfaces 181 and 182 of the lower support portions 18. Accordingly, the second cover member 40 can be inhibited from rattling in the up-down direction with respect to the terminal block 4, so that generation of abnormal sound due to such rattling can be suppressed.

Each lower support portion 18 is a part of the partition plate 14 which insulates the adjacent first bolts 7 from each other. Accordingly, the terminal block 4 does not have to have the lower support portion 18 separately provided therein, so that the configuration of the electrical junction box 1 can be further simplified.

The upper side inclined surfaces 462 and 464 are formed in the upper surfaces 461 and 463 of the upper side contact portions 46 so as to be inclined downward toward the right side of the second cover main body 41. Accordingly, the second cover member 40 can be smoothly inserted into the terminal block 4.

The inclined surface 173 is formed in the lower surface 172 of the upper support portion 17B so as to be inclined upward toward the left side of the second cover main body 41. Accordingly, the second cover member 40 can be further smoothly inserted into the terminal block 4.

The lower side inclined surfaces 472 and 474 are formed in the lower surfaces 471 and 473 of the lower side contact portions 47 so as to be inclined upward toward the right side of the second cover main body 41. Accordingly, the second cover member 40 can be further smoothly inserted into the terminal block 4.

The inclined surfaces 183 and 184 are formed in the upper surfaces 181 and 182 of the lower support portions 18 so as to be inclined downward toward the left side of the second cover main body 41. Accordingly, the second cover member 40 can be further smoothly inserted into the terminal block 4.

The upper surface 19*a* of each intermediate support portion 19 which is placed between the pair of left and right lower support portions 18 is located below the upper surface 181 or 182 of each lower support portion 18. Therefore, when inserting the second cover member 40 from the lateral side of the terminal block 4, the second cover main body 41 and each lower side contact portion 47 can be inhibited from coming into contact with the upper surface 19*a* of each intermediate support portion 19 of the terminal block 4. Accordingly, the second cover member 40 can be further smoothly inserted into the terminal block 4.

The inclined surface 19*b* is formed in the upper surface 19*a* of each intermediate support portion 19 so as to be inclined downward toward the left side of the second cover main body 41. Accordingly, the second cover member 40 can be further smoothly inserted into the terminal block 4.

The restraining portion 43 restrains the second cover member 40 from coming out from the terminal block 4 in a state where the second cover member 40 is inserted into the terminal block 4. Therefore, the second bolts 8 can be inhibited from falling off from the terminal block 4.

Others

The second cover member 40 of the present embodiment is inserted from the left side into the internal side of the terminal block 4, but is not limited thereto. For example, the second cover member 40 may be inserted from the right side into the internal side of the terminal block 4, or similar to the first cover member 20, the second cover member 40 may be attached to the terminal block 4 from below the terminal block 4 as long as the second cover member 40 does not interfere with the first cover member 20. In addition, the second cover member 40 has the upper side contact portions 46 and the lower side contact portions 47 which inhibit the second cover member 40 from rattling in the up-down direction with respect to the terminal block 4, but in addition thereto, the second cover member 40 may have another contact portion which inhibits the second cover member 40 from rattling in the right-left direction with respect to the terminal block 4.

Each of the numbers of the lower fitting holes 23 and the lateral fitting holes 25 of the first cover member 20 is discretionary and can be changed. Similarly, each of the numbers of the lower projection portions 15, the lateral projection portions 16, and the intermediate support portions 19 of the terminal block 4 is discretionary and can be changed. The lower projection portions 15, the lower support portion 18B, and the intermediate support portions 19 of the terminal block 4 may be provided separately from the partition plates 14.

Each of the plurality of first conductive plates 5 and the plurality of second conductive plates 6 of the present embodiment are placed in a row in the right-left direction, but are not limited thereto, and may be placed, for example, in a row in the front-back direction. In addition, the plurality of second conductive plates 6 of the present embodiment are placed in a row so as to be parallel to the plurality of first conductive plates 5, but are not limited thereto and may be placed, for example, in a row in the front-back direction which is perpendicular to the plurality of first conductive plates 5.

The embodiments disclosed herein are merely illustrative in all aspects and should not be recognized as being restrictive. The scope of the present disclosure is defined by the scope of the claims rather than the meaning described above, and is intended to include meaning equivalent to the scope of the claims and all modifications within the scope.

The invention claimed is:

1. An electrical junction box to be installed in a vehicle, the electrical junction box comprising:

- a terminal block;
- a plurality of first conductive members provided to the terminal block and placed so as to be aligned in a row;
- a plurality of second conductive members provided to the terminal block and placed so as to be aligned in another row;
- a plurality of first bolts tightened to the terminal block from below and fixing electric wires, which are electrically connected to the first conductive members, respectively, to the terminal block;
- a plurality of second bolts tightened to the terminal block from below and fixing electric wires, which are electrically connected to the second conductive members, respectively, to the terminal block;
- a first cover member provided to the terminal block and covering heads of the plurality of first bolts from below; and
- a second cover member provided to the terminal block and covering heads of the plurality of second bolts from below, wherein
- the terminal block has a lower projection portion which projects downward with respect to the heads of the plurality of first bolts, the first cover member has a first cover main body which extends in a row direction in which the plurality of first conductive members are aligned, a lower fitting hole which is formed in the first cover main body and into which the lower projection portion is fitted, and the lower projection portion has a lower surface positioned within the lower fitting hole in a state where the lower projection portion is fitted into the lower fitting hole.

2. The electrical junction box according to claim 1, wherein the heads of the plurality of second bolts are placed on an internal side of the terminal block with respect to the heads of the plurality of first bolts, and the second cover member covers the heads of the plurality of second bolts from below in a state where the second cover member is inserted from a lateral side of the terminal block into the internal side of the terminal block.

3. An electrical junction box to be installed in a vehicle, the electrical junction box comprising:

a terminal block;

a plurality of first conductive members provided to the terminal block and placed so as to be aligned in a row;

a plurality of second conductive members provided to the terminal block and placed so as to be aligned in another row;

a plurality of first bolts tightened to the terminal block from below and fixing electric wires, which are electrically connected to the first conductive members, respectively, to the terminal block;

a plurality of second bolts tightened to the terminal block from below and fixing electric wires, which are electrically connected to the second conductive members, respectively, to the terminal block;

a first cover member provided to the terminal block and covering heads of the plurality of first bolts from below; and a second cover member provided to the terminal block and covering heads of the plurality of second bolts from below, wherein the terminal block has a lower projection portion which projects downward with respect to the heads of the plurality of first bolts, and the first cover member has a first cover main body which extends in a row direction in which the plurality of first conductive members are aligned, a lower fitting hole which is formed in the first cover main body and into which the lower projection portion is fitted, and a side surface contact portion which is provided so as to project laterally from a side surface in the row direction of the lower fitting hole and comes into contact with a side surface of the lower projection portion in a state where the lower projection portion is fitted into the lower fitting hole.

4. The electrical junction box according to claim 3, wherein the lower projection portion is a part of a partition plate which insulates the adjacent first bolts from each other.

5. The electrical junction box according to claim 3, wherein a projection portion side inclined surface is formed in the side surface of the lower projection portion so as to be inclined such that a thickness in the row direction of the lower projection portion gradually decreases toward a lower side.

6. The electrical junction box according to claim 3, wherein a contact side inclined surface is formed in a projection end surface of the side surface contact portion so as to be inclined toward the side surface of the lower fitting hole as extending upward.

7. The electrical junction box according to claim 3, wherein the projection end surface of the side surface contact portion has an arcuate surface which comes into line contact with the side surface of the lower projection portion.

8. The electrical junction box according to claim 3, wherein a contact length in an up-down direction by which the projection end surface of the side surface contact portion comes into contact with the side surface of the lower projection portion when the lower projection portion is fitted into the lower fitting hole is not greater than ½ of a contact length in the up-down direction by which the side surface of the lower projection portion comes into contact with the projection end surface.

9. The electrical junction box according to claim 1, wherein the terminal block has a lateral projection portion which is provided so as to project laterally, and the first cover member has a first cover side body which extends in the up-down direction on a lateral side of the terminal block, a lateral fitting hole which is formed in the first cover side body and into which the lateral projection portion is fitted, and an upper surface contact portion which is provided so as to project downward from an upper surface of the lateral fitting hole and comes into contact with an upper surface of the lateral projection portion in a state where the lateral projection portion is fitted into the lateral fitting hole.

10. The electrical junction box according to claim 9, wherein a first inclined surface is formed in a lower surface of the upper surface contact portion so as to be inclined upward toward a side opposite to a fitting direction of the lateral projection portion.

11. An electrical junction box to be installed in a vehicle, the electrical junction box comprising:

a terminal block;

a plurality of first conductive members provided to the terminal block and placed so as to be aligned in a row;

a plurality of second conductive members provided to the terminal block and placed so as to be aligned in another row;

a plurality of first bolts tightened to the terminal block from below and fixing electric wires, which are electrically connected to the first conductive members, respectively, to the terminal block;

a plurality of second bolts tightened to the terminal block from below and fixing electric wires, which are electrically connected to the second conductive members, respectively, to the terminal block;

a first cover member provided to the terminal block and covering heads of the plurality of first bolts from below; and a second cover member provided to the terminal block and covering heads of the plurality of second bolts from below, wherein the terminal block has a lateral projection portion which is provided so as to project laterally, and the first cover member has a first cover side body which extends in the up-down direction on a lateral side of the terminal block, a lateral fitting hole which is formed in the first cover side body and into which the lateral projection portion is fitted, and an upper surface contact portion which is provided so as to project downward from an upper surface of the lateral fitting hole and comes into contact with an upper surface of the lateral projection portion in a state where the lateral projection portion is fitted into the lateral fitting hole, a first inclined surface is formed in a lower surface of the upper surface contact portion so as to be inclined upward toward a side opposite to a fitting direction of the lateral projection portion, and a second inclined surface is formed in the lower surface of the upper surface contact portion so as to be inclined in the same direction as the first inclined surface on the fitting direction side of the first inclined surface and come into contact with the upper surface of the lateral projection portion.

12. The electrical junction box according to claim 11, wherein the second inclined surface is more gently inclined than the first inclined surface.

13. An electrical junction box to be installed in a vehicle, the electrical junction box comprising:

a terminal block;

a plurality of first conductive members provided to the terminal block and placed so as to be aligned in a row;

a plurality of second conductive members provided to the terminal block and placed so as to be aligned in another row;

a plurality of first bolts tightened to the terminal block from below and fixing electric wires, which are electrically connected to the first conductive members, respectively, to the terminal block;

a plurality of second bolts tightened to the terminal block from below and fixing electric wires, which are electrically connected to the second conductive members, respectively, to the terminal block;

a first cover member provided to the terminal block and covering heads of the plurality of first bolts from below; and a second cover member provided to the terminal block and covering heads of the plurality of second bolts from below, wherein the heads of the plurality of second bolts are placed on an internal side of the terminal block with respect to the heads of the plurality of first bolts, the second cover member covers the heads of the plurality of second bolts from below in a state where the second cover member is inserted from a lateral side of the terminal block into the internal side of the terminal block, the terminal block has an upper support portion which projects downward with respect to the heads of the plurality of second bolts, and a lower support portion which is placed below the upper support portion so as to be spaced apart therefrom, and the second cover member has a second cover main body which extends in another row direction in which the plurality of second conductive members are aligned and is inserted between the upper support portion and the lower support portion, an upper side contact portion which is provided so as to project upward from an upper surface of the second cover main body and comes into contact with a lower surface of the upper support portion, and a lower side contact portion which is provided so as to project downward from a lower surface of the second cover main body and comes into contact with an upper surface of the lower support portion.

14. The electrical junction box according to claim 13, wherein the lower support portion is a part of a partition plate which insulates the adjacent first bolts from each other.

15. The electrical junction box according to claim 13, wherein an upper side inclined surface is formed in an upper surface of the upper side contact portion so as to be inclined downward toward an insertion end side of the second cover main body.

16. The electrical junction box according to claim 13, wherein an upper support side inclined surface is formed in the lower surface of the upper support portion so as to be inclined upward toward a side opposite to an insertion direction of the second cover main body.

17. The electrical junction box according to claim 13, wherein a lower side inclined surface is formed in a lower surface of the lower side contact portion so as to be inclined upward toward the insertion end side of the second cover main body.

18. The electrical junction box according to claim 13, wherein a lower support side inclined surface is formed in the upper surface of the lower support portion so as to be inclined downward toward the side opposite to the insertion direction of the second cover main body.

19. The electrical junction box according to claim 13, wherein the terminal block has a pair of the lower support portions which are placed so as to be spaced apart from each other in the other row direction, and an intermediate support portion which is placed between the pair of the lower support portions, and an upper surface of the intermediate support portion is located below the upper surface of each of the lower support portions.

20. The electrical junction box according to claim 19, wherein an intermediate inclined surface is formed in the upper surface of the intermediate support portion so as to be inclined downward toward the side opposite to the insertion direction of the second cover main body.

21. The electrical junction box according to claim 2, wherein the second cover member has a restraining portion which restrains the second cover member from coming out from the terminal block.

* * * * *